US011575541B1

(12) United States Patent
Styszynski

(10) Patent No.: US 11,575,541 B1
(45) Date of Patent: Feb. 7, 2023

(54) MAPPING OF VIRTUAL ROUTING AND FORWARDING (VRF) INSTANCES USING ETHERNET VIRTUAL PRIVATE NETWORK (EVPN) INSTANCES

(71) Applicant: Juniper Networks, Inc., Sunnyvale, CA (US)

(72) Inventor: Michal Styszynski, Antony (FR)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/304,161

(22) Filed: Jun. 15, 2021

(51) Int. Cl.
*H04L 12/46* (2006.01)
*H04L 45/586* (2022.01)

(52) U.S. Cl.
CPC ...... *H04L 12/4633* (2013.01); *H04L 12/4679* (2013.01); *H04L 45/586* (2013.01)

(58) Field of Classification Search
CPC ............. H04L 12/4633; H04L 12/4679; H04L 45/586
See application file for complete search history.

(56) References Cited

U.S. PATENT DOCUMENTS

| | | | | |
|---|---|---|---|---|
| 10,313,224 B2* | 6/2019 | Srinivasan | ............... | H04L 45/48 |
| 10,454,758 B2* | 10/2019 | Boutros | ................... | H04L 45/28 |
| 11,228,459 B2* | 1/2022 | Subramanian | ...... | H04L 12/4641 |
| 2014/0369345 A1* | 12/2014 | Yang | ................... | H04L 12/1886 |
| | | | | 370/392 |
| 2015/0188808 A1* | 7/2015 | Ghanwani | ........... | H04L 41/0663 |
| | | | | 709/244 |
| 2017/0171056 A1* | 6/2017 | Dong | ...................... | H04L 12/66 |
| 2018/0302321 A1* | 10/2018 | Manthiramoorthy | ....................... | H04L 12/4641 |
| 2018/0309596 A1* | 10/2018 | Brissette | ............. | H04L 12/4679 |
| 2020/0067830 A1* | 2/2020 | Malhotra | ................ | H04L 45/28 |

FOREIGN PATENT DOCUMENTS

WO 2013184846 A1 12/2013

OTHER PUBLICATIONS

Sajassi et al., "Requirements for Ethernet VPN (EVPN)," RFC 7209, Internet Engineering Task Force (IETF), May 2014, 15 pp.
(Continued)

*Primary Examiner* — Mohamed A. Wasel
(74) *Attorney, Agent, or Firm* — Shumaker & Sieffert, P.A.

(57) ABSTRACT

Methods, systems, and devices map an arbitrary number of Virtual Routing and Forwarding (VRF) instances to an Ethernet Virtual Private Network (EVPN) instance (EVI) of a leaf and spine network. For example, a spine network device executes a primary EVI to provide an EVPN to a plurality of leaf network devices, each leaf network device executing a secondary EVI to provide a plurality of network virtualization overlays to tenants of the network. The primary EVI is associated with a primary VRF instance, and each secondary EVI of the plurality of secondary EVIs is associated with a secondary VRF instance of a plurality of secondary VRF instances. The spine network device defines mappings between routes within the primary VRF instance and routes within each secondary VRF instance. The spine network device translates, based on the one or more mappings, network traffic between the primary EVI and the plurality of secondary EVIs.

18 Claims, 11 Drawing Sheets

(56) References Cited

OTHER PUBLICATIONS

Sajassi et al., "BGP MPLS-Based Ethernet VPN," RFC 7432, IETF, Feb. 2015, 56 pp.
Sajassi et al., "A Network Virtualization Overlay Solution using EVPN draft-ietf-bess-evpn-overlay-11," Internet Draft, IETF, Jan. 12, 2018, 31 pp.
Rabadan et al., "Interconnect Solution for EVPN Overlay networks draft-ietf-bess-dci-evpn-overlay-10," Internet Draft, IETF, Mar. 2, 2018, 29 pp.
Rabadan et al., "IP Prefix Advertisement in EVPN draft-ietf-bess-evpn-prefix-advertisement-11," Internet Draft, IETF, May 18, 2018, 36 pp.
Homchaudhuri et al., "Cisco Systems' Private VLANs: Scalable Security in a Multi-Client Environment," RFC 5517, IETF, Feb. 2010, 12 pp.
Sharma et al., "Multi-site EVPN based VXLAN using Border Gateways draft-sharma-multi-site-evpn-03," Internet Draft, IETF, Jul. 17, 2017, 21 pp.

\* cited by examiner

MAPPING OF VIRTUAL ROUTING AND FORWARDING (VRF) INSTANCES USING ETHERNET VIRTUAL PRIVATE NETWORK (EVPN) INSTANCES

TECHNICAL FIELD

This disclosure generally relates to computer networks.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities. Data centers are often made up of a large number of devices, including both servers and devices that form an Internet Protocol (IP) fabric. The IP fabric may be represented as an underlay network having leaf and spine network devices.

SUMMARY

Techniques are disclosed for mapping an arbitrary number of Virtual Routing and Forwarding (VRF) instances to an Ethernet Virtual Private Network (EVPN) instance (EVI) of a leaf and spine network. In one example, a spine network device of a leaf and spine network executes a primary Ethernet Virtual Private Network (EVPN) instance (EVI) to provide an EVPN to a plurality of leaf network devices of the leaf and spine network. Each of the plurality of leaf network devices executes a secondary EVI of a plurality of secondary EVIs to provide a plurality of network virtualization overlays to tenants of the plurality of leaf network devices. The techniques of the disclosure are applicable to many different types of encapsulation formats and/or virtualization overlays. For example, each secondary EVI may be associated with, e.g., a Virtual eXtensible Local Area Network (VXLAN) Virtual Network Identifier (VNI) mapped to a Virtual Local Area Network (VLAN) identifier (VLAN-ID) or VLAN-name, where a vian-based EVPN service-type is used.

Additional other type of encapsulation formats or virtualization overlays not expressly described herein may also be used.

The primary EVI is assigned a primary Virtual Network Identifier (VNI) and associated with a primary VRF instance. Further, each secondary EVI of the plurality of secondary EVIs is assigned a different secondary VNI and associated with a different secondary VRF instance. The spine network device defines mappings between routes within the primary VRF instance and routes within the secondary VRF instance for each secondary EVI of the plurality of secondary EVIs. The spine network device may use the mappings to translate network traffic between the primary EVI and the plurality of secondary EVIs. For example, the network device may use the mappings to translate network traffic originating within the primary EVI and specifying the primary VNI into traffic suitable for forwarding into a particular secondary EVI of the plurality of secondary EVIs and specifying a secondary VNI corresponding to the secondary EVI. Additionally, the network device may use the mappings to translate network traffic originating within a particular secondary EVI and specifying a corresponding secondary VNI into traffic suitable for forwarding into the primary EVI and specifying the primary VNI. In this fashion, the techniques of the disclosure enable a network device to map an arbitrary number of VRF instances (e.g., one VRF instance for each secondary EVI) to a single EVI (e.g., the primary EVI).

In some examples, the spine network device defines a pseudo-mesh group mapping a logical interface labeled with the primary VNI to a logical interface labeled with a secondary VNI of a secondary EVI of the plurality of secondary EVIs. The spine network device further defines a mesh group mapping the logical interface labeled with the secondary VNI to a physical interface of a leaf network device executing the secondary EVI. In response to receiving Broadcast, Unknown unicast, and Multicast (BUM) traffic originating within the primary EVI and specifying the logical interface labeled with the primary VNI, the spine network device translates, based on the pseudo-mesh group, the BUM traffic specifying the logical interface labeled with the primary VNI into BUM traffic specifying the logical interface labeled with the secondary VNI. Further, the spine network device translates, based on the mesh group, the BUM traffic specifying the logical interface labeled with the secondary VNI into BUM traffic specifying the physical interface of the leaf network device of the plurality of leaf network devices executing the secondary EVI. The spine network device forwards the BUM traffic to the physical interface of the leaf network device executing the secondary EVI.

The techniques of the disclosure may provide specific improvements to the computer-related field of computer networking that have practical applications. For example, conventional techniques may allow for only a single network virtualization overlay (e.g., such as a single VXLAN or VLAN) to be mapped to a single VNI. Furthermore, each VNI is typically mapped to a single VRF instance. This may therefore limit the maximum number of VRFs that may be deployed within a single EVI to the number of VNIs usable by the EVI. The techniques of the disclosure enable a network device to implement hierarchical tiers comprising a primary EVI mapped to a plurality of secondary EVIs, thereby enabling a network device to map an arbitrary number 'N' VRF instances (e.g., each associated with a secondary EVI) to a single EVI (e.g., the primary EVI) and corresponding VNI. The techniques of the disclosure may therefore enable the efficient and scalable deployment of large numbers of VRF instances within an EVPN, which in turn may allow for large-scale deployment of VRF instances amongst multiple geographically separate datacenters while maintaining single-hop isolation between each tenant within a secondary EVI to a common gateway device (e.g., the spine network device) to a primary EVI. Further, the techniques of the disclosure enable two hops of separation between each tenant of each secondary EVI to each tenant of each other secondary EVI through the common gateway device to the primary EVI. In some examples, the techniques of the disclosure may be used to distribute EVPN Type-1, Type-2, Type-3, or Type-5 routes between a primary EVI and a secondary EVI.

In one example, this disclosure describes a method comprising: executing, with a spine network device of a plurality of network devices of a leaf and spine network, a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices, wherein the primary EVI is associated with a primary Virtual Routing and Forwarding (VRF) instance, and wherein each secondary EVI of the plurality of secondary EVIs is associated with a secondary VRF instance of a plurality of secondary VRF instances, defining, by the spine network device, one or more mappings between routes within the primary VRF instance and routes within each secondary VRF instance of the plurality of secondary VRF instances; and translating, by the spine network device and based on the one or more mappings, network traffic between the primary EVI and a secondary EVI of the plurality of secondary EVIs.

In another example, this disclosure describes a spine network device of a plurality of network devices of a leaf and spine network, the spine network device configured to: execute a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices, wherein the primary EVI is associated with a primary Virtual Routing and Forwarding (VRF) instance, and wherein each secondary EVI of the plurality of secondary EVIs is associated with a secondary VRF instance of a plurality of secondary VRF instances, define one or more mappings between routes within the primary VRF instance and routes within each secondary VRF instance of the plurality of secondary VRF instances; and translate, based on the one or more mappings, network traffic between the primary EVI and a secondary EVI of the plurality of secondary EVIs.

In another example, this disclosure describes a non-transitory, computer-readable medium comprising instructions that, when executed, are configured to cause processing circuitry of a spine network device of a plurality of network devices of a leaf and spine network to: execute a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices, wherein the primary EVI is associated with a primary Virtual Routing and Forwarding (VRF) instance, and wherein each secondary EVI of the plurality of secondary EVIs is associated with a secondary VRF instance of a plurality of secondary VRF instances, define one or more mappings between routes within the primary VRF instance and routes within each secondary VRF instance of the plurality of secondary VRF instances; and translate, based on the one or more mappings, network traffic between the primary EVI and a secondary EVI of the plurality of secondary EVIs.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
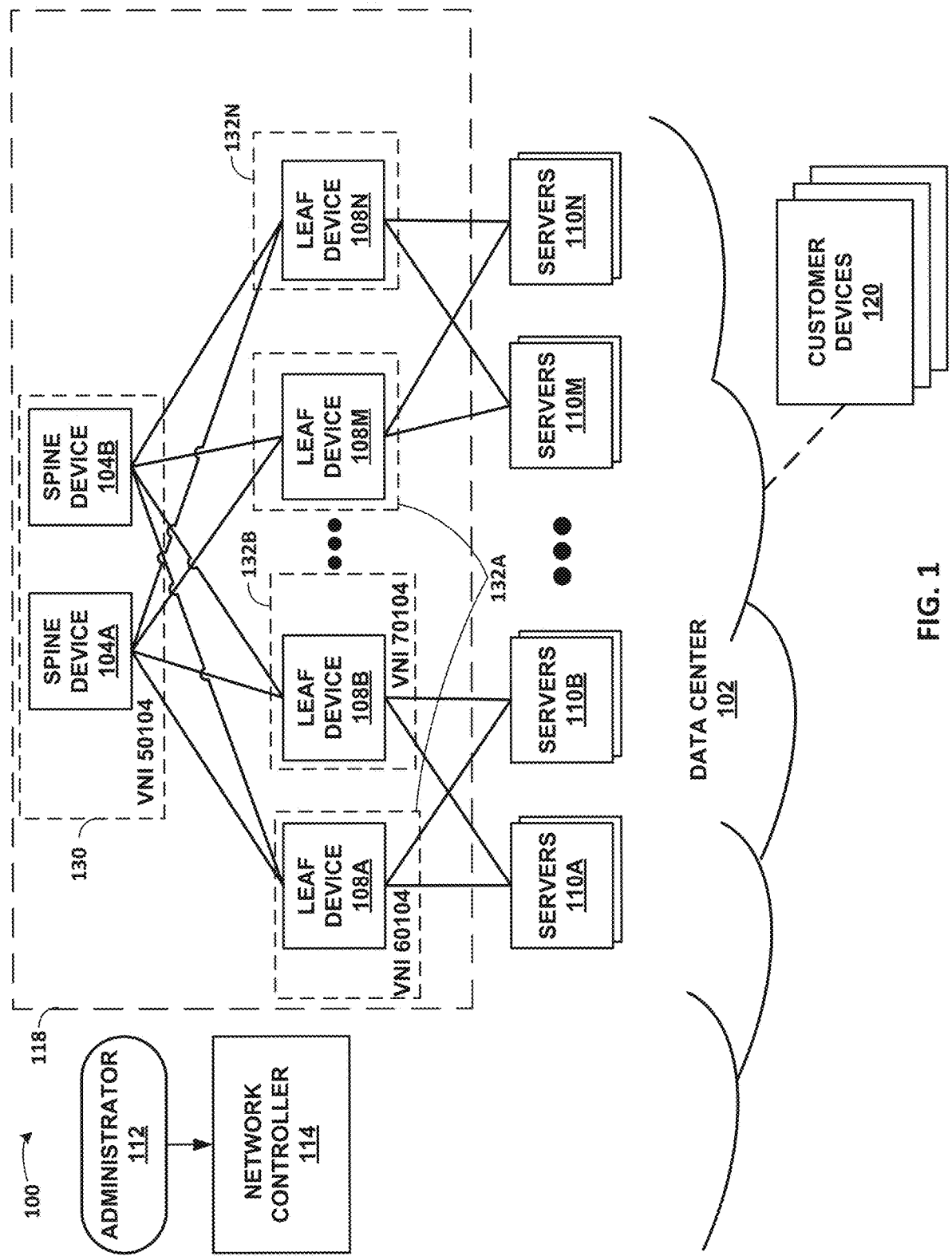
FIG. 1 is a block diagram illustrating an example network configured to provide N:1 mapping of network virtualization overlays to an EVI and associated VNI for an EVPN VXLAN in accordance with techniques described in this disclosure.

FIG. 1 is a block diagram illustrating an example network configured to provide N:1 mapping of network virtualization overlays to an EVI and associated VNI for an EVPN VXLAN in accordance with techniques described in this disclosure. While VXLAN is provided as an example throughout the disclosure, the techniques of the disclosure may be applied to different types of encapsulation formats. For example, each secondary EVI may be, e.g., a Virtual eXtensible Local Area Network (VXLAN) instance, a Virtual Local Area Network (VLAN) instance, Geneve, or other type of encapsulation format.

FIG. 1 illustrates an example network 100 including a data center 102 connected to customer devices 120. Data center 102 may, for example, host infrastructure equipment, such as networking and storage systems, redundant power supplies, and environmental controls. In general, data center 102 provides an operating environment for applications and services for customer devices 120 coupled to the data center, e.g., by a service provider network (not shown). In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example of FIG. 1, data center 102 may be a facility that provides network services to customers through customer devices 120.

Customer devices 120 may include the devices of entities (such as enterprises and governments) and of individuals. For example, a network data center may host web services for both enterprises and end users. Other example services may include data storage, virtual private networks, traffic engineering, file service, data mining, scientific- or supercomputing, and so on. In some examples, data center 102 may be individual network servers, network peers, or otherwise. In some examples, data center 102 is an enterprise or internal data center.

Data center 102 may include one or more interconnected servers, e.g., servers 110A-110N (collectively, "servers 110") that each provides execution and storage environments for applications and data associated with customers via customer devices 120 and may be physical servers, virtual machines, or combinations thereof. Servers 110 are interconnected via an IP fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices.

In the example of FIG. 1, network controller 114 provides a high-level controller for configuring and managing routing and switching infrastructure of data center 102. Network controller 114 may represent, for example, a software defined network (SDN) controller that communicates and manages the devices of data center 102 using an SDN protocol. In some examples, network controller 114 may communicate and manage the devices of data center 102 using eXtensible Messaging and Presence Protocol (XMPP), or Border Gateway Protocol messages. Additionally, or alternatively, network controller 114 may communicate with the routing and switching infrastructure of data center 102 using other interface types, such as a Simple Network Management Protocol (SNMP) interface, a Device Management Interface (DMI), a CLI, Interface to the Routing System (IRS), or any other device configuration interface.

Network controller 114 provides a logically- and in some cases, physically-centralized controller for facilitating operation of one or more networks within data center 102 in accordance with examples of this disclosure. In some examples, network controller 114 may operate in response to configuration input received from network administrator 112. Additional information regarding network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, the entire content of which is hereby incorporated by reference.

In general, network traffic within IP fabric 118, such as packet flows between servers 110, may traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Geneve label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

IP fabric 118 may provide servers 110 with redundant (multi-homed) connectivity to the IP fabric and service provider network. In this example, IP fabric 118 represents layer two (L2) and layer three (L3) switching and routing components that provide point-to-point connectivity between servers 110. In one example, IP fabric 118 comprises a set of interconnected, packet-based routers and switches that implement various protocols. In one example, IP fabric 118 may comprise devices that provide IP point-to-point connectivity. In some multi-staged networks such as IP fabric 118, each switch resides in a defined layer of the network, referred to as a CLOS topology or a spine and leaf network. As shown in the example of FIG. 1, spine network devices 104A and 104B (collectively, "spine network devices 104") reside in a first, top layer and leaf network devices 108A-108N (collectively, "leaf network devices 108") reside in a second layer. Leaf network devices 108 may be network devices that provide layer 2 (e.g., MAC) and/or layer 3 (e.g., IP) routing and/or switching functionality. Spine network devices 104 aggregate traffic flows and provides high-speed connectivity between leaf network devices 104. Spine network devices 104 are coupled to IP fabric 118 may operate as a layer 3 gateway device. Spine network devices 104 and leaf network devices 108 may each include one or more processors and a memory, and that are capable of executing one or more software processes. As shown in the example of FIG. 1, each of spine network devices 104 is communicatively coupled to each of leaf network devices 108A-108N. The configuration of network 100 illustrated in FIG. 1 is merely an example. For example, data center 102 may include any number of spine and leaf network devices.

Spine network devices 104 and leaf network devices 108 may each participate in an L2 virtual private network ("L2VPN") service, such as Ethernet Virtual Private Network (EVPN) instance (EVI). An EVPN is a service that provides a form of L2 connectivity across an intermediate L3 network, such as a service provider network, to interconnect two or more L2 networks that may be located in different racks of data center 102. Often, EVPN is transparent to the customer networks in that these customer networks are not aware of the intervening intermediate network and instead act and operate as if these customer networks were directly connected and form a single L2 network. In a way, EVPN enables a form of transparent local area network ("LAN") connection between two customer networks (e.g., different racks of data center 102) that each operates an L2 network and may also be referred to as a "transparent LAN service."

Additional example information with respect to EVPN is described in "Requirements for Ethernet VPN (EVPN)," Request for Comments (RFC) 7209, Internet Engineering Task Force (IETF), May 2014, available at https://tools.ietf.org/html/rfc7209; "BGP MPLS-Based Ethernet VPN," RFC 7432, IETF, February 2015, available at https://tools.ietf.org/html/rfc7432; "A Network Virtualization Overlay Solution using EVPN draft-ietf-bess-evpn-overlay-11," Internet Draft, IETF, Jan. 12, 2018, available at https://tools.ietf.org/html/draft-ietf-bess-evpn-overlay-11; "Interconnect Solution for EVPN Overlay networks draft-ietf-bess-dci-evpn-overlay-10," Internet Draft, IETF, Mar. 2, 2018, available at https://tools.ietf.org/html/draft-ietf-bess-dci-evpn-overlay-10; and "IP Prefix Advertisement in EVPN draft-ietf-bess-evpn-prefix-advertisement-11," Internet Draft, IETF, May 18, 2018, available at https://tools.ietf.org/html/draft-ietf-bess-evpn-prefix-advertisement-11 (hereinafter, "Rabadan et al."), the entire contents of each of which are incorporated herein by reference.

System 100 provides an EVPN that is extended by one or more network virtualization overlays to provide Layer-2 connectivity across an underlaying Layer-3 network. In some examples, system 100 uses EVPN to provide a Layer-2 control plane. Each of network virtualization overlays operates to virtually isolate groups of spine network devices 104, leaf network devices 108, and/or servers 110. For convenience, network virtualization overlays are described herein as being implemented by VXLANs to provide tunneling for the overlay virtual network. VXLAN provides a data encapsulation protocol to carry Layer-2 traffic across a Layer-3 network. In alternative examples, network virtualization overlays may use VLAN, Network Virtualization using Generic Route Encapsulation (NVGRE), Stateless Transport Tunneling (STT), Geneve, or other virtual network tunneling protocol.

Additional example information with respect to VLANs is described in "Cisco Systems' Private VLANs: Scalable Security in a Multi-Client Environment," RFC 5517, IETF, February, 2010, available at https://tools.ietf.org/html/rfc5517, the entire contents of which are incorporated herein by reference. Additional example information with respect to VXLAN is described in "Multi-site EVPN based VXLAN using Border Gateways draft-sharma-multi-site-evpn-03," Internet Draft, IETF, Jul. 17, 2017, available at https://tools.ietf.org/html/draft-sharma-multi-site-evpn-03, the entire contents of which are incorporated herein by reference.

Multiple bridge domains can be defined for a particular EVI. Typically, one or more EVIs can be associated with an L3 VPN VRF instance. For example, each data center tenant may be assigned a unique VRF instance; a tenant can encompass one or more EVIs and one or more bridge domains (e.g., VXLANs or VLANs) per EVI.

In a typical EVPN, a single EVI is associated with a single network virtualization overlay, such as a single instance of a VXLAN or VLAN. For example, a globally unique VNI corresponding to an EVI is mapped to a particular VXLAN instance. A gateway device (such as spine network device 104A) translates the VNI when network traffic crosses between the EVI and the VXLAN instance. Thus, because each VNI is also mapped to a single unique VRF instance, this practice may limit the maximum number of VRFs that may be deployed within a single EVI.

In accordance with the techniques of the disclosure, network 100 may map an arbitrary number of VRF instances to an EVI. In one example, spine network device 104A executes primary EVI 130 to provide an EVPN to leaf network devices 108. Leaf network devices 108 execute a plurality of secondary EVIs 132A-132N (collectively, "secondary EVIs") to provide a plurality of network virtualization overlays to tenants of leaf network devices 108. In some examples, each secondary EVI 132 is a VXLAN instance or a VLAN instance.

An example application of EVPN is Data Center Interconnect (DCI), which provides the ability to extend Layer-2 connectivity between different data centers. EVPN uses the concept of route types to establish sessions at the provider edge. There are many route types. An EVPN Type-5 route, also called the IP prefix route, is used to communicate between datacenters when the Layer-2 connection does not extend across datacenters and the IP subnet in a Layer-2 domain is confined within a single datacenter. In this scenario, the Type-5 route enables connectivity across datacenters by advertising the IP prefixes assigned to the VXLANs confined within a single datacenter. Data packets are sent as Layer-2 Ethernet frames encapsulated in the VXLAN header with a DCI-specific routing VNI. Additionally, the gateway device for the datacenter must be able to perform Layer-3 routing and provide IRB functionality. In some examples, each secondary EVI is provisioned to a different data center of a plurality of geographically-separate data centers, and spine network device 104A operates as a DCI for the plurality of data centers.

Primary EVI 130 is assigned a primary VNI and associated with a primary VRF instance. Further, each secondary EVI 132 is assigned a different secondary VNI and associated with a different secondary VRF instance. Spine network device 104A defines mappings between routes within the primary VRF instance of primary EVI 130 and routes within the secondary VRF instance for each of secondary EVIs 132. Spine network device 104A may use the mappings to translate network traffic between primary EVI 130 and each of secondary EVIs 132. In this fashion, system 100 may map an arbitrary number of VRF instances (e.g., one VRF instance for each secondary EVI 132) to a single EVI (e.g., primary EVI 132).

For example, spine network device 104A receives network traffic originating from, e.g., a core network within primary EVI 130 (not depicted in FIG. 1) and specifying the primary VNI. In some examples, the network traffic is associated with a network service hosted by servers 110 and provided to customer devices 120. Spine network device 104A translates, based on the mappings, the network traffic specifying the primary VNI into network traffic suitable for forwarding into, e.g., secondary EVI 132A and specifying a secondary VNI corresponding to secondary EVI 132A. Spine network device 104A forwards, to leaf network device 108A within secondary EVI 132A, the traffic specifying the secondary VNI corresponding to secondary EVI 132A.

As another example, spine network device 104A receives network traffic originating from, e.g., leaf network device 108B within secondary EVI 132B and specifying a secondary VNI corresponding to EVI 132B. Spine network device 104A translates, based on the mappings, the network traffic specifying the secondary VNI corresponding to EVI 132B into network traffic suitable for forwarding into, e.g., primary EVI 130 and specifying the primary VNI. Spine network device 104A forwards, e.g., into the core network within primary EVI 130 (not depicted in FIG. 1), the traffic specifying the primary VNI.

As another example, and as depicted in FIG. 1, secondary EVI 132A is executed by leaf network device 108A and 108M. In this example, spine network device 104A receives first network traffic originating from, e.g., leaf network device 108A within secondary EVI 132A and specifying a secondary VNI corresponding to EVI 132A. Spine network device 104A translates, based on the mappings, the first network traffic specifying the secondary VNI corresponding to EVI 132A into second network traffic suitable for forwarding into, e.g., primary EVI 130 and specifying the primary VNI. Spine network device 104A forwards, via an Integrated Routing and Bridging (IRB) interface and to spine network device 104B, the second network traffic specifying the primary VNI. Spine network device 104B translates, based on the mappings, the second network traffic specifying the primary VNI into first network traffic suitable for forwarding back into secondary EVI 132A and specifying the secondary VNI corresponding to secondary EVI 132A. Spine network device 104B forwards, to leaf network device 108M within secondary EVI 132A, the first traffic specifying the secondary VNI corresponding to secondary EVI 132A.

In some examples, an IP prefix originated in a secondary pure EVPN Type-5 instance is represented within a primary EVPN Type-5 instance with a new routing VNI value. In this example, the IP prefix has two extended communities: a Router MAC corresponding to the secondary pure EVPN Type-5 VRF and a new Router MAC corresponding to the primary community. The IP prefix uses the standard-based Extended Community Route-Target information of 8-octet value. Further, the IP prefix uses a new local Route Distinguisher as part of the primary routing instance. The overlay index in both cases (primary and secondary VRF) is equal to zero, as is the ESI value of the EVPN Type-5 prefix advertisement. The load balancing is based on IP Equal-cost Multi-path (ECMP) techniques, as opposed to the overlay index or using the ESI 10-byte value. The primary and secondary VRF follow the interfaceless IP-VRF-to-IP-VRF model described in Section 4.4.1 of Rabadan et al. In addition to local VRF router community information, the primary VRF further includes the secondary VRF router community information. Thus, the pure EVPN Type-5 implementation described herein leverages both secondary and primary Route Target information as part of the primary IP-VRF-to-IP-VRF EVPN Type-5 prefix advertisement.

The techniques of the disclosure enable a network device, such as spine network devices 104, to implement hierarchical tiers comprising a primary EVI mapped to a plurality of secondary EVIs, thereby enabling the network device to map an arbitrary number 'N' VRF instances (e.g., each associated with a secondary EVI 132) to a single EVI (e.g., primary EVI 130) and corresponding VNI. The techniques of the disclosure may therefore enable the efficient and scalable deployment of large numbers of VRF instances within an EVPN, which in turn may allow for large-scale deployment of VRF instances amongst multiple geographically separate datacenters while maintaining single-hop isolation between each tenant within a secondary EVI to a common gateway device (e.g., the spine network device) to a primary EVI. Further, the techniques of the disclosure enable two hops of separation between each tenant of each secondary EVI to each tenant of each other secondary EVI through the common gateway device to the primary EVI.

Figure 2:
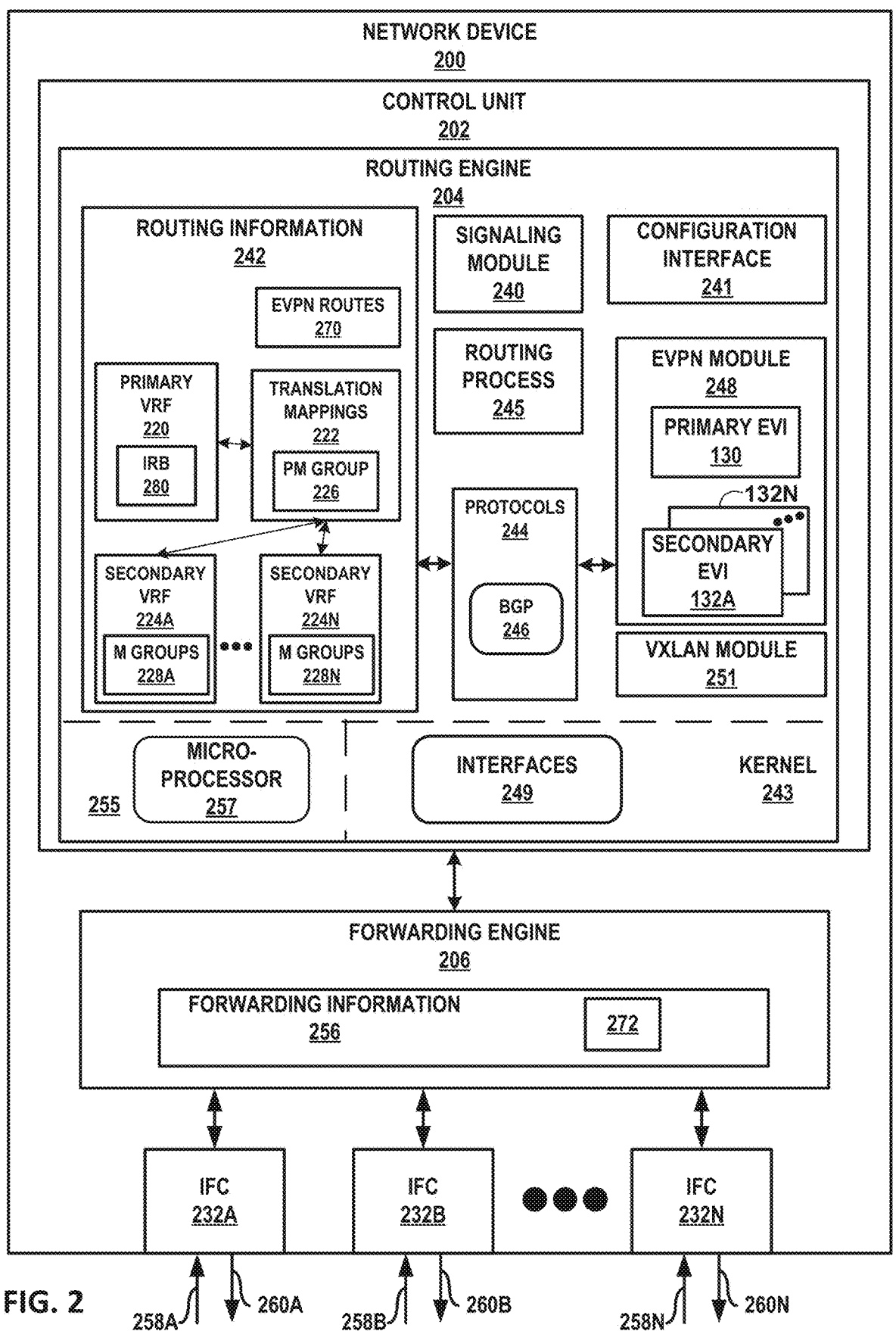
FIG. 2 is a block diagram illustrating an example of a network device configured to provide N:1 mapping for an EVPN VXLAN in accordance with techniques described in this disclosure.

FIG. 2 is a block diagram illustrating an example of a network device configured to provide N:1 mapping for an EVPN VXLAN in accordance with techniques described in this disclosure. Network device 200 may represent an example instance of any of spine network devices 104 of FIG. 1.

Network device 200 includes a control unit 202 that includes a routing engine 204, and control unit 202 is coupled to a forwarding engine 206. Forwarding engine 206 is associated with one or more of interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Interfaces for inbound links 258 and outbound links 260 may represent physical interfaces, logical interfaces, or some combination thereof. Interfaces for links 258, 260 may represent local interfaces of network device 200 for Ethernet links for one or more Ethernet segments of a network.

Elements of control unit 202 and forwarding engine 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols. Control unit 202, in some examples, retrieves and executes the instructions from memory for these aspects.

Routing engine 204 includes kernel 243, which provides a run-time operating environment for user-level processes. Kernel 243 may represent, for example, a UNIX operating system derivative such as Linux or Berkeley Software Distribution (BSD). Kernel 243 offers libraries and drivers by which user-level processes may interact with the underlying system. Hardware environment 255 of routing engine 204 includes microprocessor 257 that executes program instructions loaded into a main memory (not shown in FIG. 2) from a storage device (also not shown in FIG. 2) in order to execute the software stack, including both kernel 243 and processes executing on the operating environment provided by kernel 243. Microprocessor 257 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 243 provides an operating environment for a routing process 245 that executes various protocols 244 at different layers of a network stack, including protocols for implementing EVPNs. For example, routing engine 204 includes network protocols 244 that operate at a network layer of the network stack. In the example of FIG. 2, network protocols 244 include the Border Gateway Protocol (BGP) 246, which is a routing protocol. Routing engine 204 may also include other protocols, such as an MPLS label distribution protocol and/or other MPLS protocols, such as Resource reSerVation Protocol (RSVP) or Label Distribution Protocol (LDP), not expressly shown in FIG. 2. Routing engine 204 is responsible for the maintenance of routing information 242 to reflect the current topology of a network and other network entities to which network device 200 is connected. In particular, routing protocols periodically update routing information 242 to accurately reflect the topology of the network and other entities based on routing protocol messages received by network device 200.

Kernel 243 includes an interfaces table 249 ("interfaces 249") that represents a data structure that includes a corresponding entry for each logical interface configured for network device 200. Logical interfaces may correspond to local interfaces of network device 200 for Ethernet segments. Entries for respective logical interfaces may specify respective current information describing the logical interfaces.

Routing information 242 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP 246) or defines the network topology with interconnected links learned using a link state routing protocol (e.g., IS-IS or OSPF).

Routing engine 204 also includes an EVPN module 248 that performs L2 learning using BGP 246. EVPN module 248 may maintain tables for each EVI established by network device 200, or in alternative examples, may maintain one or more tables that are independent of each respective EVI. Network device 200 may use EVPN module 248 to advertise, e.g., EVPN routes, including Ethernet AD (Type-1) routes to advertise reachability of network device 200 for an Ethernet segment, Media Access Control (MAC) with IP advertisement (Type-2) routes to advertise a MAC and/or IP address of network device 200, Inclusive Multicast Ethernet Tag (IMET) (Type-3) routes to advertise information about network device 200 that is used to send BUM traffic to network device 200, or IP prefix (Type-5) routes to advertise an IP prefix for an EVI to which network device 200 belongs. EVPN module 248 may also send other EVPN routes, such as, Ethernet segment routes (Type-4) to discover other network devices of the Ethernet segment and for purposes of designated forwarder (DF) election (and backup DF election) for the Ethernet segment, and others. EVPN module 248 may store information from the routes, such as the identification of network devices connected to an analyzer.

Signaling module 240 outputs control plane messages to automatically establish tunnels to interconnect multiple network devices including network device 200 and otherwise provision one or more EVIs configured for network device 200 and other network devices. Signaling module 240 may signal the network devices using one or more suitable tunnel signaling protocols, such as GRE, VXLAN, and/or MPLS protocols. Signaling module 240 can communicate with forwarding engine 206 to automatically update forwarding information 256. In some examples, signaling module 240 may be part of or executed by routing process 245.

Routing engine 204 also includes a configuration interface 241 that receives and may report configuration data for network device 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the network device 200, and other constructs that at least partially define the operations of network device 200, including the techniques described herein.

Forwarding engine 206 represents hardware and logic functions that provide high-speed forwarding of network traffic. Forwarding engine 206 typically includes a set of one or more forwarding chips programmed with forwarding information 256 that maps network destinations with specific next hops and the corresponding output interface ports. In general, when network device 200 receives a packet via one of inbound links 258, forwarding engine 206 identifies an associated next hop for the data packet by traversing the programmed forwarding information 256 based on information within the packet. Forwarding engine 206 forwards the packet on one of outbound links 260 mapped to the corresponding next hop.

In the example of FIG. 2, forwarding engine 206 includes forwarding information 256. In accordance with routing information 242, forwarding engine 206 stores forwarding information 256 that maps packet field values to network destinations with specific next hops and corresponding outbound interface ports. For example, routing engine 204 analyzes routing information 242 and generates forwarding information 256 in accordance with routing information 242. Forwarding information 256 may be maintained in the form of one or more tables, link lists, radix trees, databases, flat files, or any other data structures.

Forwarding engine 206 stores forwarding information 256 for each EVPN instance (EVI) established by network device 200 to associate network destinations with specific next hops and the corresponding interface ports. Forwarding engine 206 forwards the data packet on one of outbound links 260 to the corresponding next hop in accordance with forwarding information 256. At this time, forwarding engine 206 may push and/or pop labels from the packet to forward the packet along a correct label switched path.

Routing process 245 may generate EVPN routes and send and receive, via BGP 246 sessions with other network devices, EVPN routes. Routing process 245 may store generated EVPN routes and import/store received EVPN routes to a route table storing EVPN routes 270 in routing information 242.

In accordance with the techniques of the disclosure, network 200 may map an arbitrary number of VRF instances to an EVI. In one example, EVPN module 248 of routing engine 204 configures primary EVI 130 and a plurality of secondary EVIs 132A-132N (collectively, "secondary EVIs 132"). In some examples, each secondary EVI 132 is mapped to a VXLAN instance or a VLAN instance executed by, e.g., leaf network devices 108 of FIG. 1. EVI module 248 assigns a primary VNI to primary EVI 130. Further, EVI module 248 assigns a different secondary VNI to each secondary EVI 132.

Routing information 242 stores primary VRF instance 220, which routing engine 204 associates with primary EVI 130 (and the primary VNI). Further, routing information 242 stores a plurality of secondary VRF instances 224A-224N (collectively, "secondary VRF instances 224"). Routing engine 204 associates each secondary VRF instance 224 with a corresponding one of secondary EVIs 132.

Routing information 242 further includes translation mappings 222. Translation mappings 222 define mappings between routes within primary VRF instance 220 of primary EVI 130 and routes within a secondary VRF instance 224 for each secondary EVI 132. In some examples, translation mappings 222 define mappings between a routing and information base (RIB) of primary EVI 130 and a RIB of each secondary EVI 132. Routing engine 204 uses translation mappings 222 to translate network traffic between primary EVI 130 and each of secondary EVIs 132. For example, routing engine 204 may use translation mappings 222 to translate network traffic specifying a primary VNI for primary EVI 130 into network traffic specifying a secondary VNI for a secondary EVI 132.

In some examples, translation mappings 222 includes pseudo-mesh group (PM group) 226. Pseudo-mesh group 226 specifies mappings of logical interfaces labeled with a primary VNI corresponding to primary EVI 130 to logical interfaces labeled with a secondary VNI corresponding to a secondary EVI 132. Each secondary VRF instance 224 further defines a corresponding one of mesh groups (M groups) 228A-228N (collectively, "mesh groups 228"). Each mesh group 228 specifies mappings of the logical interface of pseudo-mesh group 226 which is labeled with the secondary VNI corresponding to the secondary EVI 132 to a physical interface of a device within the corresponding secondary EVI 132. Pseudo-mesh group 226 and mesh groups 228 are logical constructs that may be used to control the flooding of broadcast, unknown unicast, and multicast (BUM) traffic to specific interfaces within a particular mesh group.

For example, pseudo-mesh group 226 specifies that a first logical interface of primary EVI 130 maps to a second logical interface of secondary EVI 132A, and mesh group 228A specifies that the second logical interface of secondary EVI 132A maps to, e.g., a first physical interface of leaf network device 108A of FIG. 1. In this fashion, network device 200 may map an arbitrary number of VRF instances (e.g., one of secondary VRF instances 224 for each secondary EVI 132) to a single EVI (e.g., primary EVI 130).

For example, routing engine 204 receives network traffic originating from a network device within primary EVI 130 and specifying the primary VNI. Routing engine 204 translates, based on translation mappings 222, the network traffic specifying the primary VNI into network traffic suitable for forwarding into, e.g., secondary EVI 132A and specifying a secondary VNI corresponding to secondary EVI 132A. Routing engine 204 forwards, via IFCs 232 and to a network device within secondary EVI 132A, the traffic specifying the secondary VNI corresponding to secondary EVI 132A.

For example, routing engine 20 may translate, based on pseudo-mesh group 226, BUM traffic originating within primary EVI 130 and specifying a logical interface labeled with the primary VNI into BUM traffic specifying a logical interface labeled with a secondary VNI associated with secondary VRF 224A. Further, routing engine 20 may translate, based on mesh group 228A, the BUM traffic specifying the logical interface labeled with the secondary VNI associated with secondary VRF 224A into BUM traffic specifying a physical interface of a network device executing secondary EVI 132A (such as one of leaf network devices 108 of FIG. 1). Routing engine 20 may forward, via IFCs 232, the BUM traffic toward the physical interface of the network device executing secondary EVI 132A.

As another example, routing engine 204 receives network traffic originating from, e.g., a network device within secondary EVI 132A and specifying a secondary VNI corresponding to EVI 132A. Routing engine 204 translates, based on translation mappings 222, the network traffic specifying the secondary VNI corresponding to EVI 132A into network traffic suitable for forwarding into, e.g., primary EVI 130 and specifying the primary VNI. Routing engine 204 forwards, via IFCs 232 and to a network device within primary EVI 130, the traffic specifying the primary VNI.

In some examples, IRB 280 of primary VRF instance 220 provides integrated routing and bridging functionality to primary EVI 130. IRB 280 may allow network device 200 to extend a Layer 2/Layer 3 domain, such as primary EVI 130, across more than one data center site or geographical location.

As described above, routing engine 204 translates network traffic between primary EVI 130 and secondary EVIs 132. In some examples, the network traffic is associated with a network service provided to a customer device, such as customer devices 120 of FIG. 1. In some examples, the network traffic may comprise an EVPN route type. Examples of EVPN route types which may be exchanged in accordance with the techniques of the disclosure are described below:

EVPN Type-1 route. The EVPN Type-1 route specifies an Ethernet autodiscovery route. In some examples, the EVPN Type-1 route specifies an Ethernet autodiscovery route for a secondary EVI 132. Additional information with respect to an EVPN Type-1 route is set forth in RFC7432, as described above.

EVPN Type-2 route. The EVPN Type-2 route specifies a Media Access Control (MAC) with IP advertisement route. In some examples, the EVPN Type-2 route specifies a MAC with IP advertisement route for a secondary EVI 132. Type-2 routes are per-VLAN routes, so typically, only PEs that are part of a VNI need these routes. EVPN allows an end host's IP and MAC addresses to be advertised within the EVPN Network Layer reachability information (NLRI). This allows for control plane learning of ESI MAC addresses. Because there are many Type-2 routes, a separate route-target auto-derived per VNI helps to confine their propagation. This route type may be supported by all EVPN switches and routers. Additional information with respect to an EVPN Type-2 route is set forth in RFC7432, as described above.

EVPN Type-3 route. The EVPN Type-3 route specifies an inclusive multicast (IM) Ethernet tag route. In some examples, the EVPN Type-3 route specifies an IM Ethernet tag route for a secondary EVI 132. Additional information with respect to an EVPN Type-3 route is set forth in RFC7432, as described above.

EVPN Type-5 route. The EVPN Type-5 route specifies an IP prefix route. In some examples, the EVPN Type-5 route specifies an IP prefix route for a secondary EVI 132. An IP prefix route provides encoding for inter-subnet forwarding. In the control plane, EVPN Type-5 routes are used to advertise IP prefixes for inter-subnet connectivity across data centers. To reach a tenant using connectivity provided by the EVPN Type-5 IP prefix route, data packets are sent as Layer-2 Ethernet frames encapsulated in a VXLAN header over an IP network across data centers. Additional information with respect to an EVPN Type-5 route is set forth in "IP Prefix Advertisement in EVPN draft-ietf-bess-evpn-prefix-advertisement-11," as described above.

Figure 3:
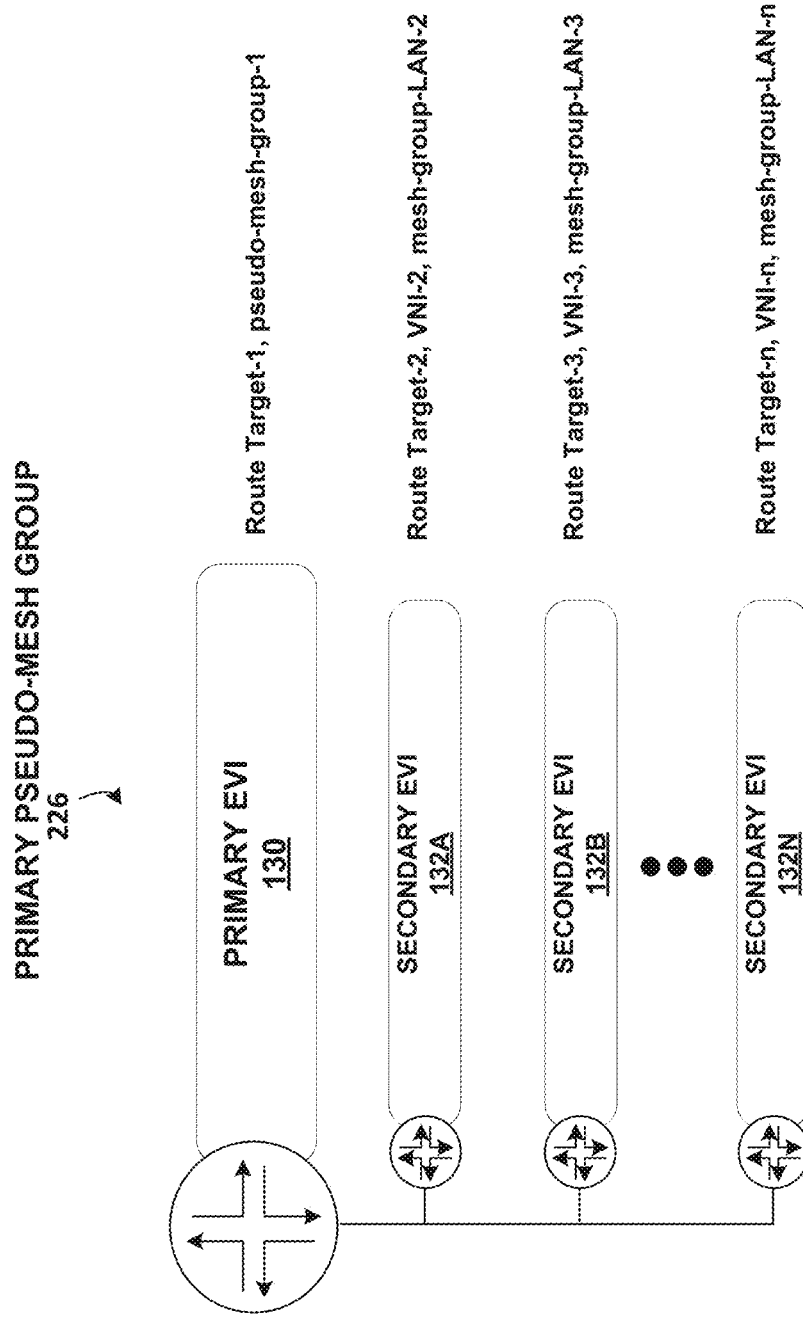
FIG. 3 is block diagram depicting an example of the pseudo-mesh group of FIG. 2 configured to provide N:1 mapping for an EVPN VXLAN in further detail.

FIG. 3 is block diagram depicting an example of pseudo-mesh group 226 of FIG. 2 configured to provide N:1 mapping for an EVPN VXLAN in accordance with techniques described in this disclosure.

The techniques of the disclosure set forth two improvements to EVPNs which allow for seamless stitching in EVI. First, the techniques of the disclosure enable a network device, such as spine network device 104 of FIG. 1, to map an arbitrary number of secondary VRF instances to one primary VRF instance. Second, the techniques of the disclosure enable a network device, such as spine network device 104 of FIG. 1, to implement a pseudo-mesh group associated with a primary VNI to inform the network device of how to flood BUM traffic from a secondary VNI to a primary VNI.

As depicted in the example of FIG. 3, primary EVI 130 is associated with route target "Route Target-1" and a pseudo-mesh group "pseudo-mesh-group-1." Secondary EVI 132A is associated with route target "Route Target-2," VNI "VNI-2," and mesh group "mesh-group-LAN-2." Secondary EVI 132B is associated with route target "Route Target-3," VNI "VNI-3," and mesh group "mesh-group-LAN-3." Secondary EVI 132N is associated with route target "Route Target-N," VNI "VNI-N," and mesh group "mesh-group-LAN-N."

Pseudo-mesh group 226 specifies mappings of logical interfaces labeled with a primary VNI corresponding to primary EVI 130 to logical interfaces labeled with a secondary VNI corresponding to a secondary EVI 132. Each mesh group specifies mappings of the logical interface of pseudo-mesh group 226 which is labeled with a secondary VNI corresponding to a secondary EVI 132 to a physical interface of a device within the corresponding secondary EVI 132. In this fashion, a network device, such as network devices 104 of FIG. 1 or network device 200 of FIG. 2, may map an arbitrary number of VRF instances (e.g., one of secondary VRF instances 224 for each secondary EVI 132) to a single EVI (e.g., primary EVI 130).

In some examples, network device 108 translates a number N of secondary VNIs to a primary VNI. In this example, a first IRB "IRB.1" is associated with only the primary VNI "VNI-1." In other words, the first RB is associated with a local primary pseudo-interface of network device 108. Further, network device 108 advertises EVPN Type-1, Type-2, and Type-3 routes originating from primary EVI 130 into secondary EVIs 132. Typically, network device 108 does not advertise EVPN Type-1, Type-2, and Type-3 routes originating from secondary EVIs 132 into primary EVI 130 by default.

In some examples, MAC mobility is configured only within secondary EVIs 132. Typically, hosts from different secondary EVIs 132 may not communicate directly with one another. For example, network device 108 blocks traffic between different secondary VNIs and secondary EVIs 132. A host connected to different secondary EVIs 132 may still use a common primary subnet or IP gateway to route to external networks.

Table 1 describes example permissions for group L2 communications between the primary EVI 130 and secondary EVIs 132 of FIG. 3. As illustrated by Table 1, communications between a pseudo-mesh group of primary EVI 130 and a mesh group of a secondary EVI 132 are permitted, communications between the same mesh group of a secondary EVI 132 are permitted, and communications between mesh groups of different secondary EVIs 132 are forbidden.

TABLE 1

Example Mesh Group L2 Communications

| Communication Between Groups: | Permission |
|---|---|
| Pseudo-mesh-group-1 to mesh-group-lan-2 | Allowed |
| Pseudo-mesh-group-1 to mesh-group-lan-3 | Allowed |
| Pseudo-mesh-group-1 to mesh-group-lan-n | Allowed |
| Mesh-group-lan-2 to mesh-group-lan-n | Disallowed |
| Mesh-group-lan-3 to mesh-group-lan-n | Disallowed |
| Mesh-group-lan-n to mesh-group-lan-2 | Disallowed |
| Mesh-group-lan-n to mesh-group-lan-3 | Disallowed |
| Mesh-group-lan-n to mesh-group-lan-n | Allowed |
| Mesh-group-lan-2 to mesh-group-lan-2 | Allowed |

Figure 4:
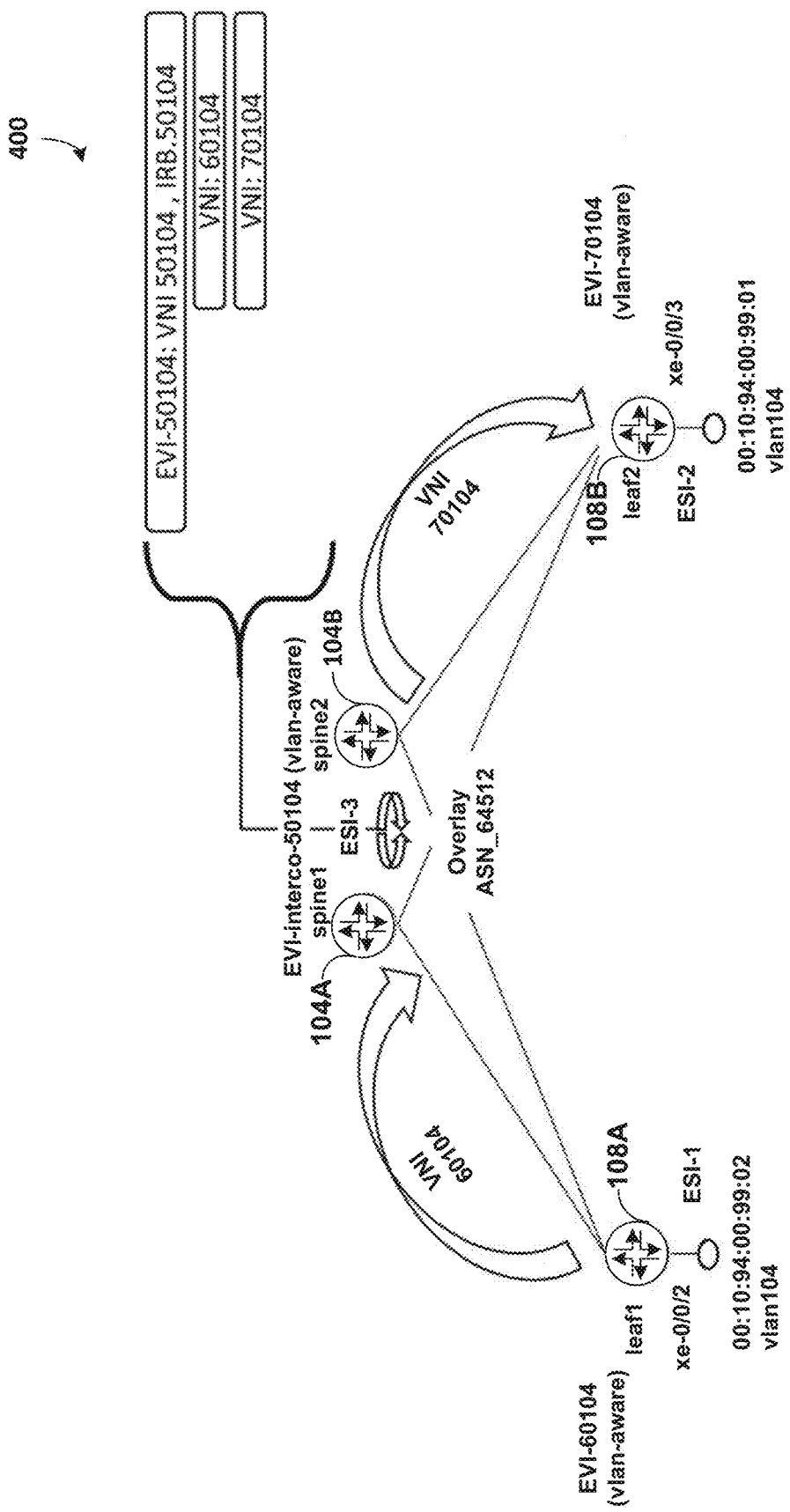
FIG. 4 is a block diagram illustrating another example network configured to provide N:1 mapping for an EVPN VXLAN, in accordance with techniques described in this disclosure.

FIG. 4 is a block diagram illustrating another example network 400 configured to provide N:1 mapping for an EVPN VXLAN, in accordance with techniques described in this disclosure. FIG. 4 depicts an example of N:1 EVI seamless stitching for an EVPN-VXLAN for local fabric purposes. In some examples, network 400 provides private VLAN and Layer-2 microsegmentation. In some examples, network 400 provides Layer-2 isolation to tenants 60104 and 70104 while providing a common subnet and first-hop gateway via spine network devices 104.

To simplify tenant isolation at Layer-2 but continue offering a common first-hop IP gateway to isolated tenants, the techniques described herein extend the concept of 1:1 VNI mapping to N:1 VNI mapping. A network as described herein may therefore offer one primary and multiple secondary bridge-domains linked together at a given stitching node (e.g., a spine network device) as a common broadcast domain in an IP leaf-spine EVPN-VXLAN data center fabric architecture. Such a network may enable the conservation of Internet Protocol version 4 (IPv4) and Internet Protocol version 6 (IPv6) addressing for various smaller Layer-2 isolated tenants which maintaining Layer-2 isolation and simple microsegmentation at the leaf level. As described herein, by providing N:1 VNI mapping, network 400 may enable a datacenter administrator to easily isolate multiple tenants at the Layer-2 level, at the same or different leaf devices, within a given EVPN-VXLAN fabric while continuing to offer a common primary first-hop IP gateway to all secondary VNI tenants.

In the example of FIG. 4, a primary EVI is configured with a VNI of 50104 and a route target of "1:5104." A first secondary EVI is configured with a VNI of 60104 and an interconnect route target of "6:104." A second secondary EVI is configured with a VNI of 70104 and an interconnect route target of "7:105." Spine network device 104A includes an additional mesh-group called "secondary-LAN." Therefore, network 400 provides more than one interconnect route target within the primary EVI.

As another example, a primary VNI "VNI50104" and Route Target "RT:1:5104" are mapped to a secondary VNI "VNI60104" and interconnect Route Target "iRT:6:104" and a secondary VNI "VNI70104" and interconnect Route Target "iRT:7:105." In some examples, leaf1 108A and leaf2 108B may originate tunnels that terminate at the spine interconnect gateway.

A MAC address originated at tenant "tenant60104" within EVI60104 is received at tenant70104 as reachable via a spine interconnect gateway between spine network devices 104. As depicted in FIG. 4, a destination MAC address 00:10:94:00:99:02 originated at leaf1 108A in EVI60104 is visible to leaf2 108B in EVI-70104 as learned and reachable via interconnect "ESI-3" at the spine level. The destination MAC address 00:10:94:00:99:01 originated at leaf2 108B in EVI-70104 is also visible to leaf1 108A in EVI60104 as reachable via the interconnect ESI-3 at the spine level.

To ensure that flooding occurs between secondary VNIs at the spine level, a new mesh-group called secondary-vni is described herein. The secondary-vni mesh group allows flooding between: 1) two secondary VNIs, as well as from 2) a locally-attached spine interconnect Provider Edge device (PE)-Customer Edge Device (CE) port that is enabled with a primary VNI to the secondary VNIs.

Typically, the interconnect gateway iGW at the spine level originates EVPN Type-1 AD routes (EVI, ESI), EVPN Type-2 MAC routes, and EVPN Type-3 IM routes, only with the secondary VNI route-target. In typical use, the primary interconnect EVI Route Target is not advertised from spine to leaf devices if the leaf devices are not enabled with the EVI-interconnect primary Route Target. The EVPN service-type handling the mapping is VLAN-aware such that the leaf-level, secondary EVIs also use that service-type.

The IRB interface enabled at the spine iGW level is mapped to the primary VLAN-VNI. The IRB interface offers first-hop IP reachability to secondary VNI tenants. However, the spine network devices typically advertise, to secondary VNIs, a MAC address and an EVPN Type-2 MAC-IP route for the IRB interface that includes a route target corresponding to a given interconnect secondary route target.

Figure 5:
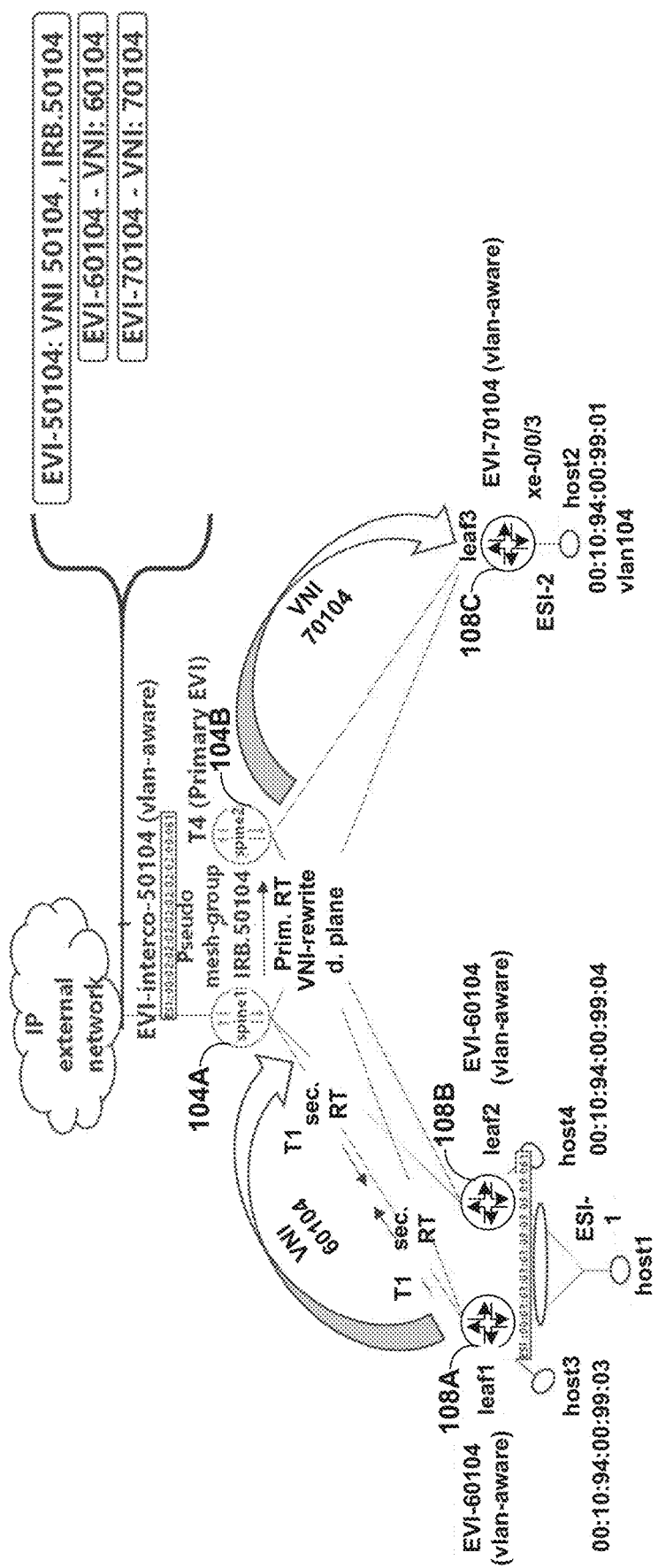
FIG. 5 is a block diagram illustrating another example network configured to provide N:1 mapping for an EVPN VXLAN, in accordance with techniques described in this disclosure.

FIG. 5 is a block diagram illustrating another example network 500 configured to provide N:1 mapping for an EVPN VXLAN, in accordance with techniques described in this disclosure. FIG. 5 depicts an example of N:1 EVI seamless stitching. In some examples, network 500 provides Layer-2 isolation to tenants 60104 and 70104 while providing a common subnet and first-hop gateway via spine network devices 104. Spine network devices 104 include an additional mesh-group called "pseudo-mesh."

In some examples, MAC mobility is configured only within the secondary EVIs. Typically, hosts from different secondary EVIs may not communicate directly with one another. For example, spine network devices 108 block traffic between different secondary VNIs and secondary EVIs such that, e.g., host2 cannot communicate with host1, host3, or host4. A host connected to different secondary EVIs may still use a common primary subnet or IP gateway to route to external networks.

In the example of FIG. 5, spine network device 104A configures a primary EVI "EVI50104" with a primary VNI "VNI50104," a primary VRF "VRF50104." Primary EVI50104 is further configured with IRB "IRB-50104." Primary EVI50104 is mapped to secondary EVI "EVI60104" and secondary EVI "EVI70104" via pseudo-mesh group "pseudo-mesh-group1." Secondary EVI60104 is configured with a secondary VNI "VNI60104" and a secondary VRF "VRF60104." Secondary EVI70104 is configured with a secondary VNI "VNI70104" and a secondary VRF "VRF70104."

Figure 6:
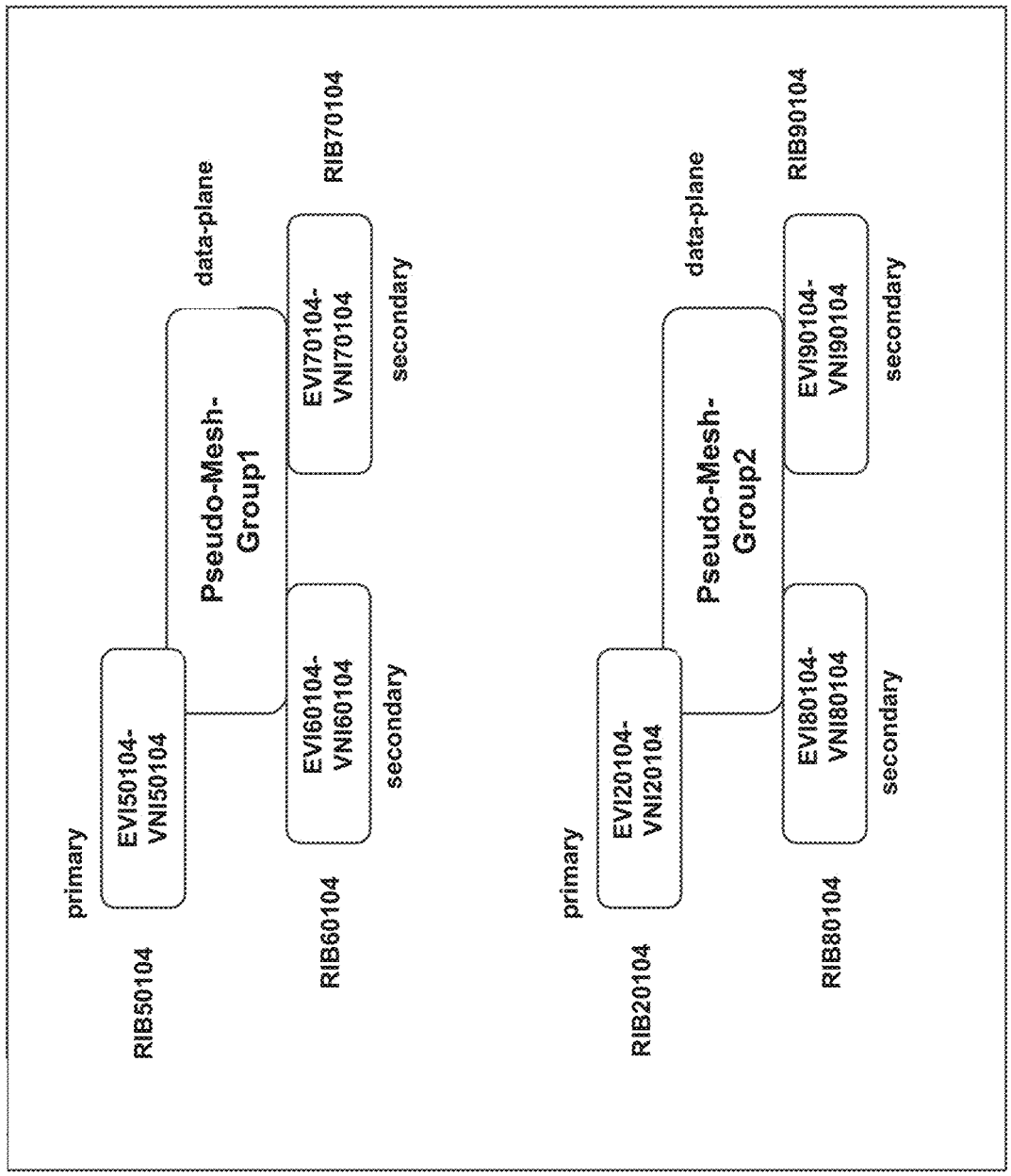
FIG. 6 is block diagram depicting an example configuration for a pseudo-mesh group configured to provide N:1 mapping for an EVPN VXLAN in accordance with techniques described in this disclosure.

FIG. 6 is block diagram depicting an example configuration for a pseudo-mesh group configured to provide N:1 mapping for an EVPN VXLAN in accordance with techniques described in this disclosure. FIG. 6 is described with respect to FIG. 5 for convenience.

In the example of FIG. 6, spine network device 104A configures a primary EVI "EVI50104" with a primary VNI "VNI50104" and a primary VRF "VRF50104." Primary EVI50104 is further configured with IRB "IRB-1." Primary EVI50104 is mapped to secondary EVI "EVI60104" and secondary EVI "EVI70104" via pseudo-mesh group "pseudo-mesh-group1." Secondary EVI60104 is configured with a secondary VNI "VNI60104" and a secondary VRF "VRF60104." Secondary EVI70104 is configured with a secondary VNI "VNI70104" and a secondary VRF "VRF70104."

Spine network device 104A configures a primary EVI "EVI20104" with a primary VNI "VNI20104" and a primary VRF "VRF20104." Primary EVI20104 is further configured with IRB "IRB-2." Primary EVI20104 is mapped to secondary EVI "EVI80104" and secondary EVI "EVI90104" via pseudo-mesh group "pseudo-mesh-group2." Secondary EVI80104 is configured with a secondary VNI "VNI80104" and a secondary VRF "VRF80104." Secondary EVI90104 is configured with a secondary VNI "VNI90104" and a secondary VRF "VRF90104."

Figure 7:
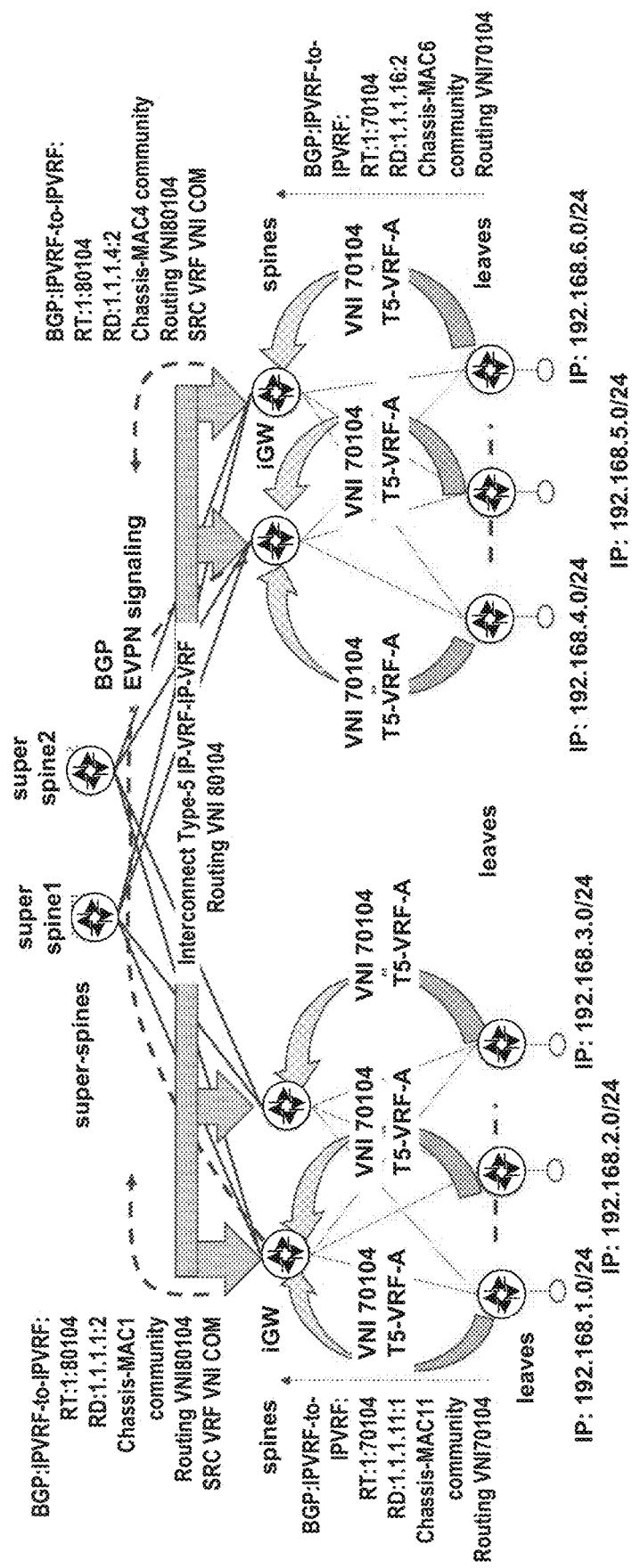
FIG. 7 is a block diagram illustrating an example network configured to provide Type-5 1:1 mapping for an EVPN VXLAN, in accordance with techniques described in this disclosure.

FIG. 7 is a block diagram illustrating an example network 700 configured to provide Type-5 1:1 mapping for an EVPN VXLAN, in accordance with techniques described in this disclosure. FIG. 7 depicts an example of pure Type-5 seamless 1:1 stitching.

FIG. 7 may operate in a substantially similar fashion to FIGS. 4 and 5, above.

In some examples, network 700 is an implementation of a larger-scale, multi-pod data center edge routed architecture or a DCI architecture that uses pure EVPN-VXLAN Type-5 routes. In such an example, the number of EVPN-VXLAN Type-5 tunnels may cause scaling issues between border-leaf devices or border-spine devices. It may be beneficial to reduce or aggregate the number of pure EVPN Type-5 routes that signal VxLAN tunnels between border-leaf devices or border-spine devices to control scaling of the fabric between the datacenter pods (or sites) or reduce the number of next-hops used at the top-of-rack switch level so as to simplify operation. Where network 700 implements a full mesh EVPN-VXLAN solution, performance issues may occur due to higher utilization of Ternary Content Addressable Memory (TCAM) at the top-of-rack switch level because of the number of remote site/pod next-hop installations. Therefore, for similar reasons as described above with respect to EVPN-VXLAN Type-2 route tunnel seamless stitching, network 700 would benefit from supporting functionality for pure EVPN Type-5 route tunnel stitching at the edge of the fabric.

In accordance with the techniques of the disclosure, a given border-leaf device or border-spine device in a first datacenter (or first pod) may terminate a server leaf-originated pure Type-5 EVPN-VxLAN tunnel and originate a new, pure Type-5 interconnect VxLAN tunnel to another border-leaf device or border-spine device located in a second datacenter (or second pod). In some examples, the operation of encapsulation and decapsulation of pure Type-5 signalized VxLAN tunnels is performed at the border-leaf or border-spine level via interconnect gateway (iGW).

As described herein, a given Type-5 EVI uses a new interconnect Route Target to a remote site for the EVPN Type-5 prefixes originated at the server leaf devices. The spine network device uses a new Type-5 routing VNI for interconnect purposes. The Edge-Routed Bridging (ERB) server leaf sees remote site (or pod) prefixes as being reachable via this local interconnect gateway provided by border-leaf devices or border-spine devices and use these devices as a next-hop to reach the remote site (or pod) prefixes. A given seamless stitching border-leaf node re-originates the iBGP received EVPN Type-5 prefixes with this local interconnect route-distinguisher.

In the following example, network 700 performs a 1:1 pure EVPN Type-5 mapping of LAN-to-WAN instance VNI:

lan-pure-type-5-vni-7001-wan-pure-type-5-vni-90000

In the following example, network 700 performs an N:1 pure EVPN Type-5 mapping of LAN-to-WAN instance VNI:

lan-pure-type-5-vni-7001--wan-pure-type-5-vni-90000
lan-pure-type-5-vni-7002--wan-pure-type-5-vni-90000
lan-pure-type-5-vni-7003--wan-pure-type-5-vni-90000
lan-pure-type-5-vni-700(n)--wan-pure-type-5-vni-90000

In the case of N:1 mapping, the WAN Type-5 route adds an extended community for a new Route Target. Further, the WAN Type-5 route retains the original community received originally from a leaf device for a given site as a second entry in the list.

In the foregoing example, seamless stitching of Pure EVPN Type-5 of LAN-to-WAN is described. However, the techniques of the disclosure enable other types of Type-5 stitching, such as pure EVPN Type-5 stitching of VXLAN to MPLS, wherein a leaf originates a pure Type-5 VXLAN tunnel stitched to an MPLS pure Type-5 tunnel.

Accordingly, the techniques of the disclosure enable a datacenter administrator with the ability to control a number of VXLAN tunnels established between a fabric border device. Further, the techniques of the disclosure enable a datacenter administrator to control the way that pure Type-5 VRF tunnels and prefixes are aggregated at the edge of a fabric. Therefore, in contrast to conventional systems that define IP-VRF-to-IP-VRF to use a traditional provider edge device (PE)-to-customer edge device (CE) approach, the techniques of the disclosure reduce a number of direct provider edge device (PE)-to-PE tunnels by using a PE as a stitching point, terminates a VXLAN tunnel from one domain and originates new VXLAN tunnels to connect two domains.

Figure 8:
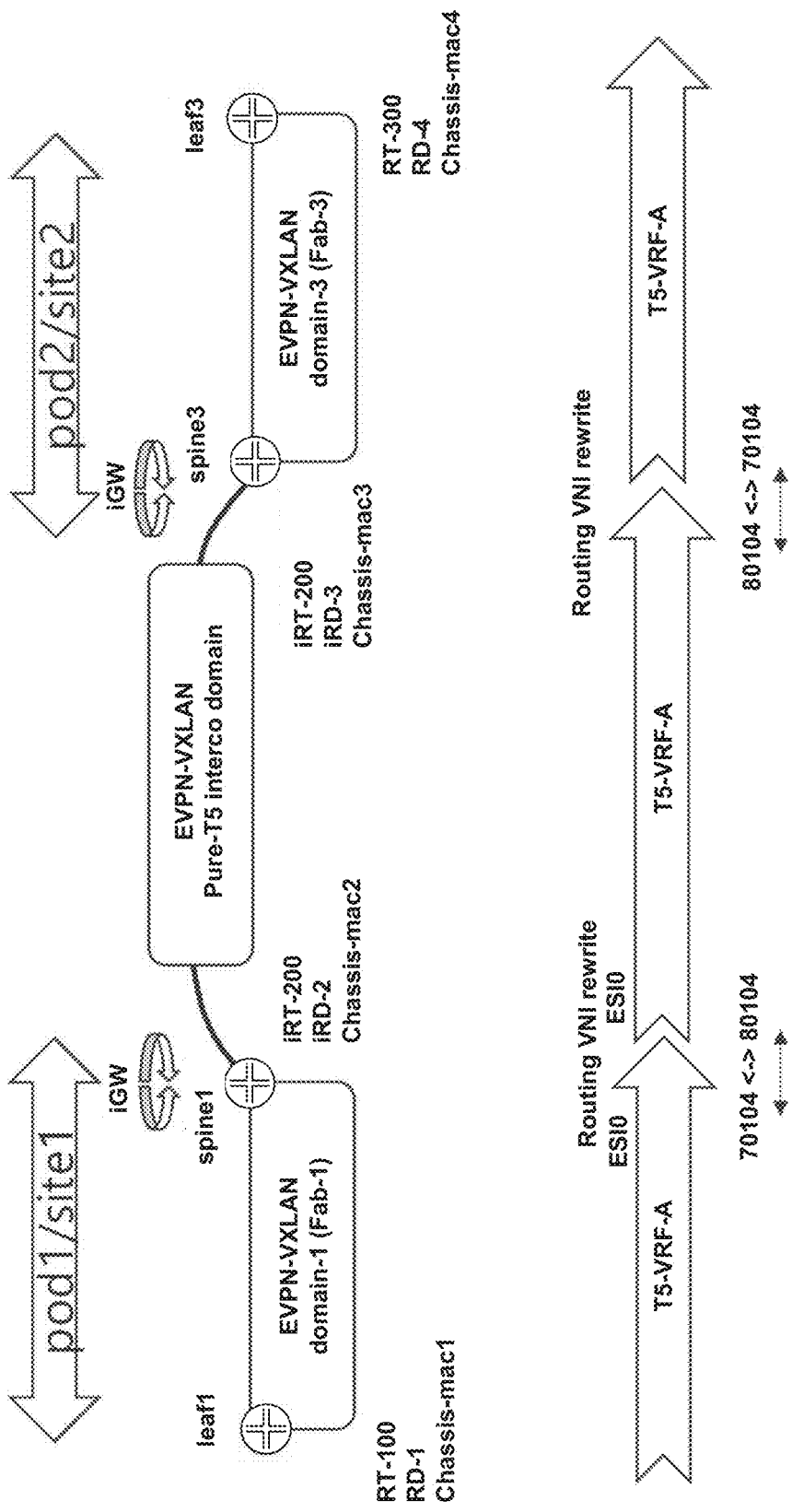
FIG. 8 is a block diagram illustrating a translation mapping for the example network of FIG. 7.

FIG. 8 is a block diagram illustrating a translation mapping for the example network of FIG. 7. FIG. 8 depicts an example of pure Type-5 seamless 1:1 stitching. As depicted in the example of FIG. 8, network 700 implements a 1:1 or N:1 seamless IP-VRF-to-IP-VRF using pure EVPN Type-5 instances. Specifically, FIG. 8 illustrates an example where an EVPN Type-5 route originating from a leaf network device "leaf1" within secondary EVI 70104 and specifying VNI 70104 is rewritten to specify VNI 80104 of primary EVI 80104. The Type-5 route is passed through EVI 80104, which provides a pure Type-5 interconnect domain, whereupon the Type-5 route is rewritten to again specify VNI 70104 and being forwarded to leaf network device "leaf2" within secondary EVI 70104.

Figure 9:
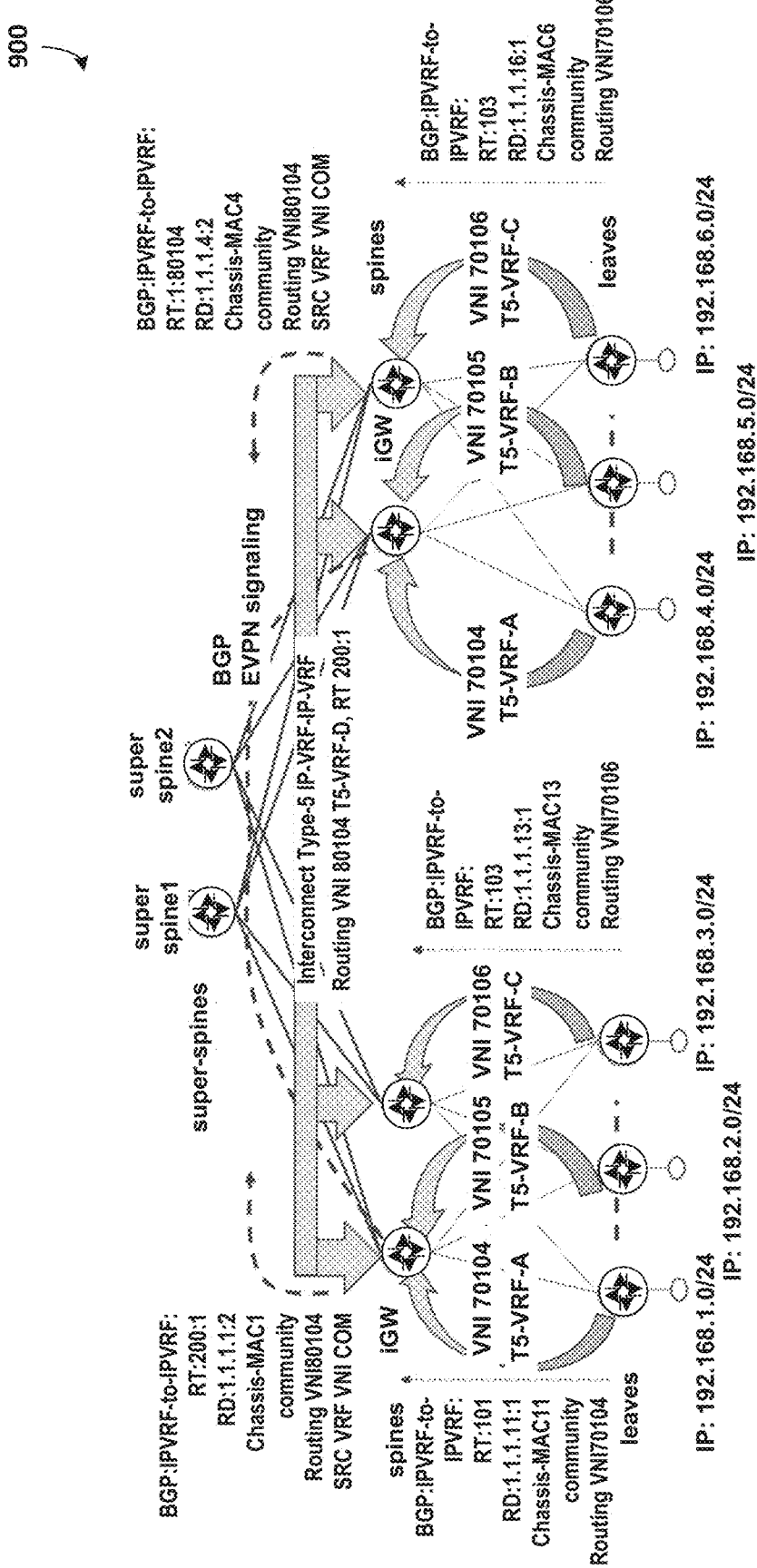
FIG. 9 is a block diagram illustrating another example network configured to provide Type-5 N:1 mapping for an EVPN VXLAN, in accordance with techniques described in this disclosure.

FIG. 9 is a block diagram illustrating another example network 900 configured to provide Type-5 N:1 mapping for an EVPN VXLAN, in accordance with techniques described in this disclosure. FIG. 9 depicts an example of pure Type-5 seamless N:1 stitching. FIG. 9 may operate in a substantially similar fashion to FIG. 7, above. However, in contrast to network 700 of FIG. 7, which provides 1:1 pure Type-5 mapping, network 900 provides N:1 mapping between multiple secondary EVIs 70104, 70105, 70106 and primary VNI 80104.

Figure 10:
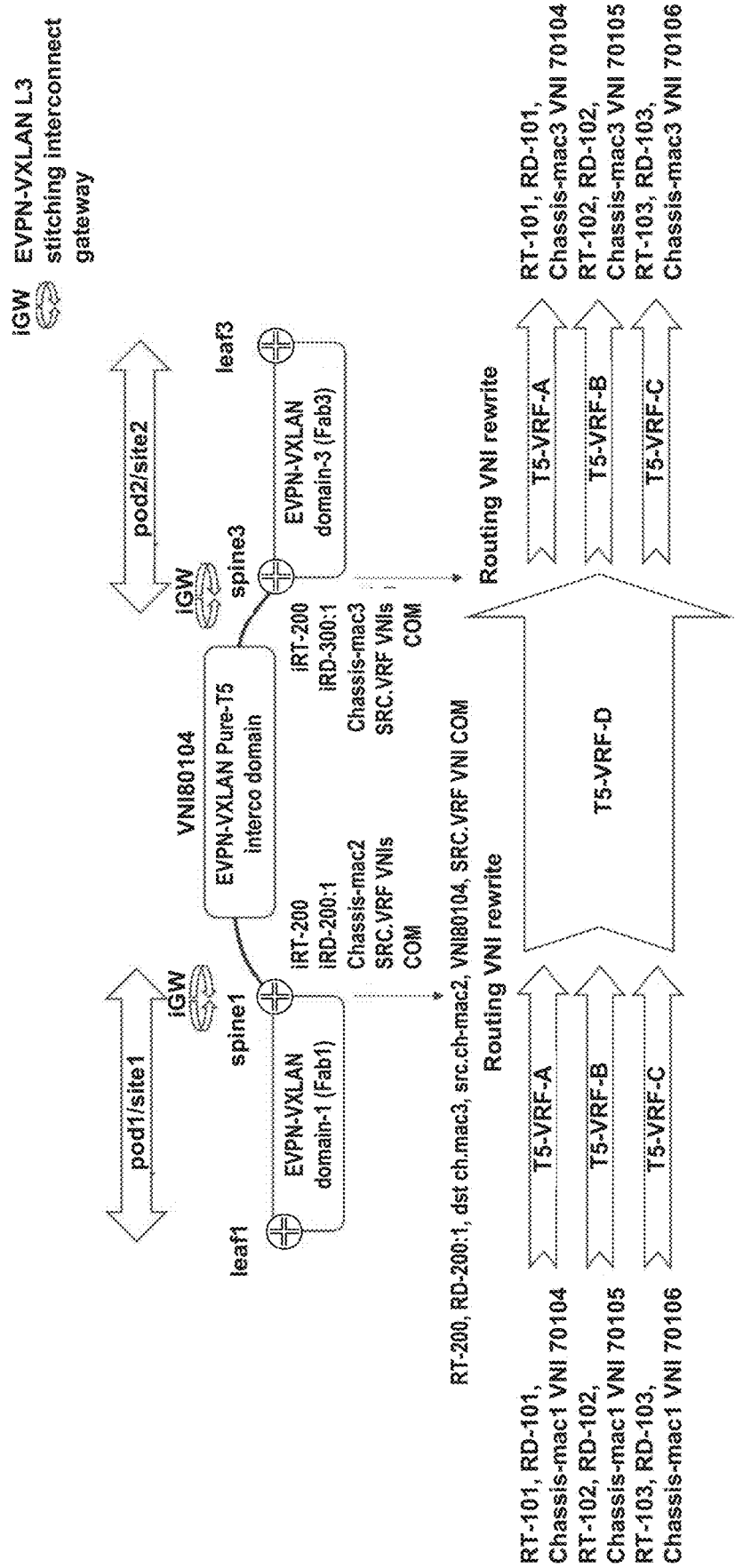
FIG. 10 is a block diagram illustrating a translation mapping for the example network of FIG. 9.

FIG. 10 is a block diagram illustrating a translation mapping for the example network of FIG. 9. FIG. 10 depicts an example of pure Type-5 seamless N:1 stitching. Specifically, FIG. 10 illustrates an example where EVPN Type-5 routes originating from a leaf network device "leaf1" within multiple secondary EVIs (e.g., EVIs 70104, 70105, 70106) is rewritten to specify VNI 80104 of primary EVI 80104. The Type-5 routes are passed through EVI 80104, which provides a pure Type-5 interconnect domain, whereupon the Type-5 routes are rewritten to again specify the VNI for the respective EVI (e.g., EVIs 70104, 70105, 70106). The Type-5 routes are then forwarded to leaf network device "leaf2" within the respective secondary EVIs 70104, 70105, 70106.

Figure 11:
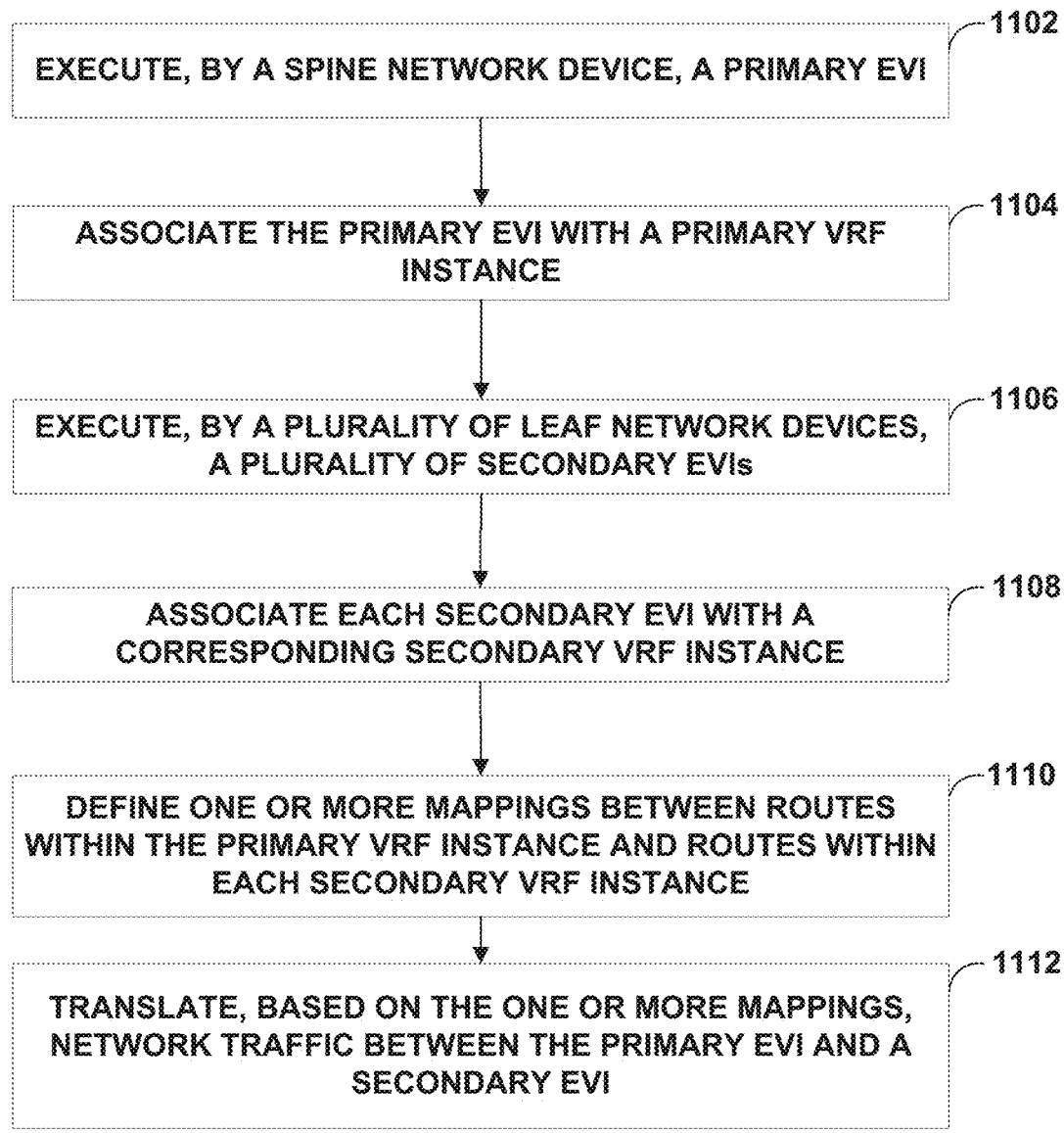
FIG. 11 is a flowchart illustrating an example operation in accordance with the techniques of the disclosure.

FIG. 11 is a flowchart illustrating an example operation in accordance with the techniques of the disclosure. FIG. 11 is described with respect to FIGS. 1 and 2 for convenience.

In the example of FIG. 11, spine network device 104A executes primary EVI 104 (1102). EVI 104 provides an EVPN to leaf network devices 108. Further, spine network device 104A associates primary EVI 104 with primary VRF instance 220 (1104).

Leaf network devices 108 execute secondary EVIs 132 (1106). Each secondary EVI 132 provides a network virtualization overlay to one or more tenants of leaf network devices 108. In some examples, each secondary EVI 132 is associated with a VXLAN instance or a VLAN instance. Spine network device 104A associates each secondary EVI 132 with a corresponding secondary VRF instance 224 (1108).

Spine network device 104A defines one or more mappings between routes within primary VRF instance 220 and routes within each secondary VRF instance 224 (1110). In some examples, spine network device 104A defines a pseudo-mesh group mapping a logical interface labeled with the primary VNI of primary EVI 130 to a logical interface labeled with a secondary VNI of secondary EVI 132A. Spine network device 104A further defines a mesh group mapping the logical interface labeled with the secondary VNI of secondary EVI 132A to a physical interface of leaf network device 108A executing secondary EVI 132A.

Spine network device 104A translates, based on the one or more mappings, network traffic between primary EVI 104 and secondary EVI 132A (1112). For example, spine network device 104A receives network traffic originating from, e.g., a core network within primary EVI 130 and specifying the primary VNI. Spine network device 104A translates, based on the mappings, the network traffic specifying the primary VNI into network traffic suitable for forwarding into, e.g., secondary EVI 132A and specifying a secondary VNI corresponding to secondary EVI 132A. Spine network device 104A forwards, to leaf network device 108A within secondary EVI 132A, the traffic specifying the secondary VNI corresponding to secondary EVI 132A.

As another example, spine network device 104A receives network traffic originating from leaf network device 108A within secondary EVI 132A and specifying a secondary VNI corresponding to EVI 132A. Spine network device 104A translates, based on the mappings, the network traffic specifying the secondary VNI corresponding to EVI 132A into network traffic suitable for forwarding into, e.g., primary EVI 130 and specifying the primary VNI. Spine network device 104A forwards, e.g., into the core network within primary EVI 130, the traffic specifying the primary VNI.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   executing, with a spine network device of a plurality of network devices of a leaf and spine network, a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices,
      wherein the primary EVI is associated with a primary Virtual Routing and Forwarding (VRF) instance and a primary Virtual Network Identifier (VNI), and
      wherein each secondary EVI of the plurality of secondary EVIs is associated with a respective secondary VRF instance of a plurality of secondary VRF instances and a respective secondary VNI of a plurality of secondary VNIs,
   defining, by the spine network device, a pseudo-mesh group mapping at least one logical interface labeled with the primary VNI to at least one logical interface labeled with a secondary VNI of a secondary EVI of the plurality of secondary EVIs;
   defining, by the spine network device, a mesh group mapping the at least one logical interface labeled with the secondary VNI to at least one physical interface of a leaf network device of the plurality of leaf network devices executing the secondary EVI;
   defining, by the spine network device and based on the pseudo-mesh group and the mesh group, one or more mappings between routes within the primary VRF instance and routes within each secondary VRF instance of the plurality of secondary VRF instances; and
   translating, by the spine network device and based on the one or more mappings, network traffic between the primary EVI and a secondary EVI of the plurality of secondary EVIs.

2. The method of claim 1, wherein translating network traffic between the primary EVI and the secondary EVI of the plurality of secondary EVIs comprises:
   receiving, by the spine network device, first Broadcast, Unknown unicast, and Multicast (BUM) traffic specifying the at least one logical interface labeled with the primary VNI;
   translating, by the spine network device and based on the pseudo-mesh group, the first BUM traffic specifying the at least one logical interface labeled with the primary VNI into second BUM traffic specifying the at least one logical interface labeled with the secondary VNI;
   translating, by the spine network device and based on the mesh group, the second BUM traffic specifying the at least one logical interface labeled with the secondary VNI into third BUM traffic specifying the at least one physical interface of the leaf network device of the plurality of leaf network devices executing the secondary EVI; and
   forwarding, by the spine network device, the third BUM traffic to the at least one physical interface the leaf network device of the plurality of leaf network devices executing the secondary EVI.

3. The method of claim 1, wherein translating the network traffic between the primary EVI and the secondary EVI of the plurality of secondary EVIs comprises:
   receiving, by the spine network device and from a leaf network device of the plurality of leaf network devices executing the secondary EVI, first network traffic specifying the secondary VNI associated with the secondary EVI;
   translating, by the spine network device and based on the one or more mappings, the first network traffic into second network traffic specifying the primary VNI associated with the primary EVI;
   forwarding, by the spine network device and to another network device within the primary EVI, the second network traffic specifying the primary VNI.

4. The method of claim 1, wherein translating the network traffic between the primary EVI and the secondary EVI of the plurality of secondary EVIs comprises:
   receiving, by the spine network device and from another network device within the primary EVI, first network traffic specifying the primary VNI associated with the primary EVI;
   translating, by the spine network device and based on the one or more mappings, the first network traffic into second network traffic specifying the secondary VNI associated with the secondary EVI; and
   forwarding, by the spine network device and to a leaf network device of the plurality of leaf network devices executing the secondary EVI, the second network traffic specifying the secondary VNI.

5. The method of claim 1,
   wherein the spine network device comprises a first spine network device, and
   wherein translating the network traffic between the primary EVI and the secondary EVI of the plurality of secondary EVIs comprises:

receiving, by the first spine network device and from a first leaf network device of the plurality of leaf network devices executing the secondary EVI, first network traffic specifying the secondary VNI associated with the secondary EVI;

translating, by the first spine network device and based on the one or more mappings, the first network traffic into second network traffic specifying the primary VNI associated with the primary EVI; and forwarding, by the first spine network device, via an Integrated Routing and Bridging (IRB) interface, and to a second spine network device, the second network traffic specifying the primary VNI, wherein the second spine network device is configured to:

translate the second network traffic into the first network traffic specifying the secondary VNI associated with the secondary EVI; and forward the first network traffic to a second leaf network device of the plurality of leaf network devices executing the secondary EVI.

6. The method of claim 1, wherein the plurality of secondary EVIs comprises a plurality of Virtual eXtensible Local Area Network (VXLAN) instances.

7. The method of claim 1, wherein the plurality of secondary EVIs comprises a plurality of Virtual Local Area Network (VLAN) instances.

8. The method of claim 1,
wherein each secondary EVI of the plurality of secondary EVIs is provisioned to a different data center of a plurality of geographically-separate data centers, and
wherein the spine network device is configured to operate as a Data Center Interconnect (DCI) for the plurality of data centers.

9. The method of claim 1, wherein the network traffic comprises an EVPN Type-1 route specifying an Ethernet autodiscovery route for the secondary EVI of the plurality of secondary EVIs.

10. The method of claim 1, wherein the network traffic comprises an EVPN Type-2 route specifying a Media Access Control (MAC) with Internet Protocol (IP) advertisement route for the secondary EVI of the plurality of secondary EVIs.

11. The method of claim 1, wherein the network traffic comprises an EVPN Type-3 route specifying an inclusive multicast (IM) Ethernet tag route for the secondary EVI of the plurality of secondary EVIs.

12. The method of claim 1, wherein the network traffic comprises an EVPN Type-5 route specifying an Internet Protocol (IP) prefix route for the secondary EVI of the plurality of secondary EVIs.

13. The method of claim 1, wherein the network traffic comprises network traffic associated with a network service provided by the secondary EVI of the plurality of secondary EVIs.

14. A spine network device of a plurality of network devices of a leaf and spine network, the spine network device configured to:

execute a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices, wherein the primary EVI is associated with a primary Virtual Routing and Forwarding (VRF) instance and a primary Virtual Network Identifier (VNI), and wherein each secondary EVI of the plurality of secondary EVIs is associated with a respective secondary VRF instance of a plurality of secondary VRF instances and a respective secondary VNI of a plurality of secondary VNIs, define a pseudo-mesh group mapping at least one logical interface labeled with the primary VNI to at least one logical interface labeled with a secondary VNI of a secondary EVI of the plurality of secondary EVIs;

define a mesh group mapping the at least one logical interface labeled with the secondary VNI to at least one physical interface of a leaf network device of the plurality of leaf network devices executing the secondary EVI;

define, based on the pseudo-mesh group and the mesh group, one or more mappings between routes within the primary VRF instance and routes within each secondary VRF instance of the plurality of secondary VRF instances; and translate, based on the one or more mappings, network traffic between the primary EVI and a secondary EVI of the plurality of secondary EVIs.

15. The spine network device of claim 14, wherein to translate network traffic between the primary EVI and the secondary EVI of the plurality of secondary EVIs, the spine network device is configured to:

receive first Broadcast, Unknown unicast, and Multicast (BUM) traffic specifying the at least one logical interface labeled with the primary VNI;

translate, based on the pseudo-mesh group, the first BUM traffic specifying the at least one logical interface labeled with the primary VNI into second BUM traffic specifying the at least one logical interface labeled with the secondary VNI;

translate, based on the mesh group, the second BUM traffic specifying the at least one logical interface labeled with the secondary VNI into third BUM traffic specifying the at least one physical interface of the leaf network device of the plurality of leaf network devices executing the secondary EVI; and forward the third BUM traffic to the at least one physical interface the leaf network device of the plurality of leaf network devices executing the secondary EVI.

16. The spine network device of claim 13, wherein to translate network traffic between the primary EVI and the secondary EVI of the plurality of secondary EVIs, the spine network device is configured to:

receive, from a leaf network device of the plurality of leaf network devices executing the secondary EVI, first network traffic specifying the secondary VNI associated with the secondary EV;

translate, based on the one or more mappings, the first network traffic into second network traffic specifying the primary VNI associated with the primary EVI;

forward, to another network device within the primary EVI, the second network traffic specifying the primary VNI.

17. The spine network device of claim 14, wherein to translate network traffic between the primary EVI and the secondary EVI of the plurality of secondary EVIs, the spine network device is configured to:

receive, from another network device within the primary EVI, first network traffic specifying the primary VNI associated with the primary EVI;

translate, based on the one or more mappings, the first network traffic into second network traffic specifying the secondary VNI associated with the secondary EVI; and forward, to a leaf network device of the plurality of leaf network devices executing the secondary EVI, the second network traffic specifying the secondary VNI.

18. A non-transitory, computer-readable medium comprising instructions that, when executed, are configured to cause processing circuitry of a spine network device of a plurality of network devices of a leaf and spine network to:

execute a primary Ethernet Virtual Private Network (EVPN) instance (EVI) to provide an EVPN to a plurality of leaf network devices of the plurality of network devices of the leaf and spine network, each of the plurality of leaf network devices executing a secondary EVI of a plurality of secondary EVIs to provide a plurality of network virtualization overlays to tenants of the plurality of leaf network devices, wherein the primary EVI is associated with a primary Virtual Routing and Forwarding (VRF) instance and a primary Virtual Network Identifier (VNI), and wherein each secondary EVI of the plurality of secondary EVIs is associated with a respective secondary VRF instance of a plurality of secondary VRF instances and a respective secondary VNI of a plurality of secondary VNIs, define a pseudo-mesh group mapping at least one logical interface labeled with the primary VNI to at least one logical interface labeled with a secondary VNI of a secondary EVI of the plurality of secondary EVIs;

define a mesh group mapping the at least one logical interface labeled with the secondary VNI to at least one physical interface of a leaf network device of the plurality of leaf network devices executing the secondary EVI;

define, based on the pseudo-mesh group and the mesh group, one or more mappings between routes within the primary VRF instance and routes within each secondary VRF instance of the plurality of secondary VRF instances; and translate, based on the one or more mappings, network traffic between the primary EVI and a secondary EVI of the plurality of secondary EVIs.

* * * * *